(12) United States Patent
Smialek

(10) Patent No.: US 7,089,256 B2
(45) Date of Patent: Aug. 8, 2006

(54) UNIVERSAL DATA EDITOR

(75) Inventor: Michael Robert Smialek, Glenview, IL (US)

(73) Assignee: Knowledge Dynamics, Inc., Glenview, IL (US)

( * ) Notice: Subject to any disclaimer, the term of this patent is extended or adjusted under 35 U.S.C. 154(b) by 197 days.

(21) Appl. No.: 09/901,804

(22) Filed: Jul. 10, 2001

(65) Prior Publication Data

US 2002/0161777 A1    Oct. 31, 2002

Related U.S. Application Data

(60) Provisional application No. 60/217,462, filed on Jul. 11, 2000.

(51) Int. Cl.
*G06F 17/00* (2006.01)
*G06F 9/44* (2006.01)

(52) U.S. Cl. ........................ 707/102; 717/105

(58) Field of Classification Search ............ 707/1, 707/100, 101, 102; 717/104, 105, 108, 109, 717/162, 165
See application file for complete search history.

(56) References Cited

U.S. PATENT DOCUMENTS

| | | | |
|---|---|---|---|
| 5,745,675 A * | 4/1998 | Herbig et al. .............. 714/38 |
| 5,995,969 A * | 11/1999 | Lee et al. .................... 707/100 |
| 6,029,169 A * | 2/2000 | Jenkins ....................... 707/100 |
| 6,381,743 B1 * | 4/2002 | Mutschler, III ............. 717/104 |
| 6,601,023 B1 * | 7/2003 | Deffler et al. .................. 703/13 |
| 6,601,072 B1 * | 7/2003 | Gerken, III ............. 707/103 R |

OTHER PUBLICATIONS

Chailloux et al "LxLisp, a portable and efficient Lisp system", ACM 1984, pp. 113-122.*
Rumbaugh et al "Object-oriented modeling and design", Prentice Hall, 1991, chapter 4, pp. 57-80.*
Esa Auramäki et al, "Universal Framework for Information Activities", ACM SIGMIS Database, vol. 19, Issue 1 Fall/Winter 1987/1988, pp. 11-20.*

* cited by examiner

*Primary Examiner*—Uyen Le
(74) *Attorney, Agent, or Firm*—Michael Best & Friedrich LLP

(57) ABSTRACT

The present invention relates to a system, method and article of manufacture wherein a plurality of objects, components, programming interfaces and user interfaces are defined to facilitate a universally applicable editing, testing and execution system for a plurality of configurable data processing systems and the edit-time data that drives them. A meta-model provides for the specification of formations of edit-time data and constraints thereof and meta-model data specifies the allowable formations of edit-time data. Coded logic steps interpret meta-model data together with edit-time data to cause a user interface to visually represent edit-time data to the user in a specified formation. The system is comprised in such a way as to not require source code changes to support varied and unanticipated edit-time data models resulting from different instantiations of the meta-model into meta-model data.

15 Claims, 38 Drawing Sheets

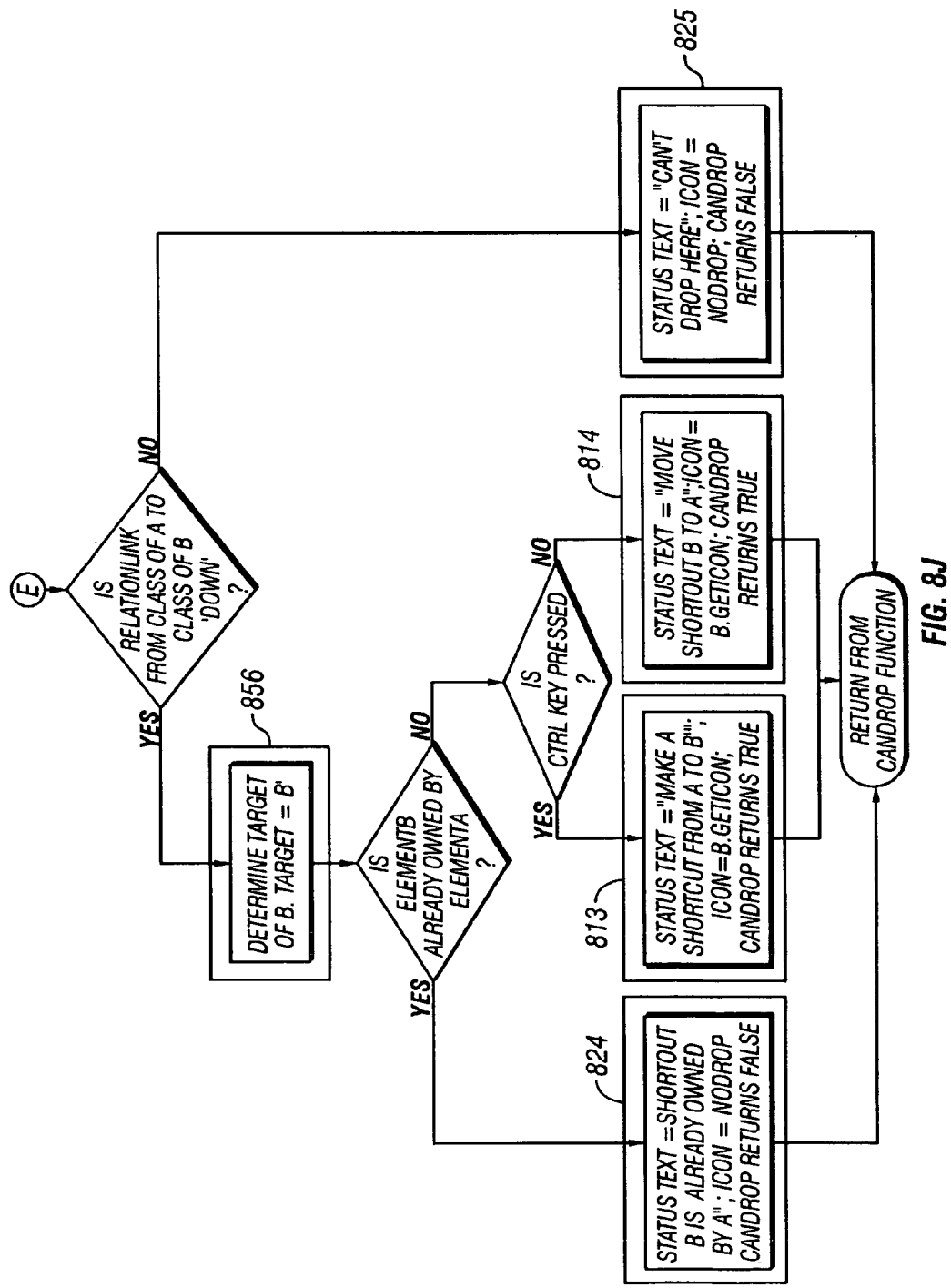

UNIVERSAL DATA EDITOR

The present application claims priority from U.S. Provisional Patent Application No. 60/217,462 filed Jul. 11, 2000, entitled "Universal Data Editor" by inventor Michael R. Smialek.

FIELD OF THE INVENTION

The present invention pertains in general to component oriented architectures for data processing engines that use static edit-time data to specify the processing behavior for dynamic run-time data, and more particularly, to a universal editing, testing, and execution system for editing the static edit-time data, testing the edit-time data with dynamic run-time-data, and executing the processing in a deployment environment.

BACKGROUND OF THE INVENTION

A typical background art "processor" system involves a processing module with processing instructions coded into the module. Typically, the process is comprised of the following steps:
A) Loading data from a data store into the module,
B) Signaling the module to process the data,
C) Exposing the results of the processing either by updating the run-time data or writing the results to a display, a data store, a printer output, or some other output representation.

A well known enhancement the background art "processor" called a "processor with options" includes enhancing the processing module to accept optional parameters to alter the run-time behavior of the processing module.

A lesser known enhancement to the background art "processor with options" called a "configurable processor" includes enhancing the processor module to be comprised of very flexible and loosely-coupled processing instructions that can be executed, ignored, or executed repeatedly in arbitrary combinations. Which instructions are executed, how frequently, and in what sequence and combination is specified in a formation of data that is specified at edit-time and conforms to a specification that is interpretable by the "configurable processor" module. Those skilled in the art have called the technique used in a "configurable processor" Dynamic Object Technology, Agent-Based Heuristic technology, and Dynamic Algorithm Technology, among other names.

The "processor with options" typically supports a list of optional parameters sometimes called 'flags' or 'switches'. A very simple example of a "processor with options" is the 'xcopy' module in a popular disk operating system. 'xcopy' can copy a file or a directory of files from one location on a computer storage medium to another. The 'xcopy' module is signaled to begin processing with a command such as:
    "xcopy c:\rootdir\*.* c:\otherdir".
This indicates that the module should copy all files in "C:\rootdir\" and place the copies in "c:\otherdir\".

The behavior of the 'xcopy' module can be altered with optional parameters. The 'xcopy' module can alternately be signaled with the command:
    "xcopy c:\rootdir\*.* c:\otherdir\/D02-13-99".
This indicates that the module should only copy files in "C:\rootdir\" that were modified on or after Feb. 13, 1999 and place the copies in "c:\otherdir\". The 'xcopy' module can furthermore be signaled with the command:
    "xcopy c:\rootdir\*.* c:\otherdir\/D02-13-99/F".
This indicates that the module should only copy files in "C:\rootdir\" that were modified on or after Feb. 13, 1999, place the copies in "c:\otherdir\". The "/F" option further indicates that 'xcopy' should display the names of the files as they are being copied. The 'xcopy' module supports nearly two dozen optional behaviors in this way.

This pattern of "processor with options" is useful where there is a relatively small number of optional behaviors available and where the optional behaviors are to be applied globally to the process. When more sophisticated behavioral control is required, the pattern quickly becomes unwieldy and a "configurable processor" is called for. For example if it is necessary to be able to specify different optional behaviors at different subdirectories a "processor with options" pattern command might look like:
    "xcopy c:\rootdir\*.* c:\otherdir\/D02-13-99 /X-c:\rootdir\childdir D02-19-99 /X-c:\rootdir\otherchilddir D01-14-99/F".

This indicates that the module should copy files from "c:\rootdir\" to "c:\otherdir\". Files in "c:\rootdir\childdir" should only be copied if they were modified after Feb. 19, 1999, Files in "c:\rootdir\otherchilddir" should only be copied if they were modified after Jan. 14, 1999, all other files should only be copied if they were modified after Feb. 13, 1999. Finally, the names of all copied files should be displayed as they are copied.

In this toy example, the configuration is still comprehensible and it is easy to see how the same results could be achieved by issuing multiple separate command signals. However, real production situations requiring a "configurable processor" typically make use of a large amount of configuration data that is difficult for a human to specify in a "processor with options" format. Furthermore, the behaviors are typically interdependent and cannot be broken into multiple distinct signals that are easier to manage.

A more effective and visual way of representing the command above might be:

| | |
|---|---|
| 1. | xcopy c:\rootdir\*.* c:\otherdir\ |
| 2. | /D02-13-99 |
| 3. | /F" |
| 4. | /X-c:\rootdir\childdir |
| 5. | D02-19-99 |
| 6. | /X-c:\rootdir\otherchilddir |
| 7. | D01-14-99 |

Where lines 1–7 represent configuration data with line 1 being the base directive for the "configurable processor". Lines 2 and 3 represent optional configuration parameters for the base directive. Lines 4 and 6 represent additional localized directives and lines 5 and 7 represent optional configuration parameters of the 4 and 6 directives respectively.

Extrapolating from this example one can see that an appropriate and effective way to represent configuration data for a "configurable processor" is with a system of software objects. In the example, one Class of software object would represent a directive and a different Class of software object would represent an optional configuration parameter. Multiple directive objects and configuration parameter objects can be specified in a tree formation of arbitrary depth and breadth, allowing the user to exert great control over 'xcopy' operations. A real "configurable processor" might make use of dozens of different Classes of software objects in this way to support rich functionality that is very flexible and scales to a high degree of sophistication.

Restated, this technique facilitates the encapsulation of particles of functionality into a "configurable processor" which can be controlled with configuration data to exhibit a wide range of very sophisticated behaviors at runtime without the need change any source code.

In most cases a "configurable processor" requires configuration data to conform to a specification that it can interpret. This means that the configuration data must contain software objects that the "configurable processor" is aware of, and that the software objects must be connected with one another only in ways that the "configurable processor" is aware of.

Stated generally, for the universe of existing and unanticipated "configurable processors", specific formations of edit-time configuration data consist of a network of software objects instantiated and connected in a way that conforms to a specification required by the "configurable processor".

For non-trivial "configurable processors", the number of allowable Classes of software objects and the constraints placed on their connections and values makes the specification of valid edit-time data formations very complex. A supportive editing environment is necessary for humans to be able to specify valid edit-time data formations effectively. Unfortunately, editing environments of this type are typically many times more effort-intensive to create than the "configurable processor" engines themselves. This dilemma hampers innovation and limits the value of using a "configurable processor" to automate a complex task.

What is needed is facility for specifying, editing, validating, managing, testing, and deploying formations of configuration data for a multiplicity of edit-time data models. This will have the benefit of reducing the total effort and cost of employing "configurable processors".

SUMMARY OF THE INVENTION

A system, method, and article of manufacture are disclosed wherein a plurality of objects, components, programming interfaces and user interfaces are defined to facilitate a universally applicable editing, testing and execution system for a plurality of configurable data processing systems and the edit-time data that drives them.

The system is comprised of a meta-model that provides for the specification of formations of edit-time data and constraints thereof.

The system is further comprised of meta-model data that specifies the allowable formations of edit-time data.

The system is further comprised of a user interface for displaying edit-time data and initiating edit actions to add, modify, and delete portions of edit-time data.

The system is further comprised of an expert system that interprets meta-model data and edit-time data to cause user interface to visually represent edit-time data to the user in a specified formation. Said expert system interprets user initiated edit actions with meta-model data and edit-time data to enforce that only valid edit actions are permitted to complete and only valid formations of edit-time data can be created.

The system is comprised in such a way as to not require source code changes to support varied and unanticipated edit-time data models. Edit-Time models can be represented entirely using instantiations of the meta-model objects into meta-model data. This allows a single, rich editing, testing, and documenting environment to automatically adapt itself to new Edit-Time models with out source code changes.

A preferred embodiment is directed at supporting a plurality of software engines that provide desired runtime behaviors and results by processing conforming static edit-time data together with dynamic run-time data.

BRIEF DESCRIPTION OF THE DRAWINGS

FIGS. 8E–L are flow charts showing that when the interface shell is in dragging mode and the user drags the drag source node over a potential drop target node, the interface shell application calls the CanDrop function on the editing expert system core engine. The editing expert system core engine analyzes the drag source node and the drop target node to determine whether the user should be allowed to drop the drag source on the drop target. CanDrop output parameters include a Boolean indicating whether the drag source node can be validly dropped on the drop target node, and a status message describing either why the source cannot be dropped on the target, or what the results of the drop will be, depending on whether the drop is allowed or not FIGS. 8M–U are flow charts showing that when the interface shell is in dragging mode and the user drags the drag source node over a potential drop target node and then drops the drag source node on the drop target node, the interface shell application calls the DragDrop function on the editing expert system core engine. The editing expert system core engine analyzes the drag source node and the drag target node to determine whether the drop constituted a valid edit operation. If said drop did not constitute a valid edit operation, DragDrop ends and no action is taken. If said drop constitutes a valid operation, then DragDrop executes the appropriate edit action, causes the shell interface to graphically depict the changes to the edit time data resulting from the DragDrop operation, and causes the shell interface to display status information describing the results of the DragDrop.

DETAILED DESCRIPTION

Figure 1:
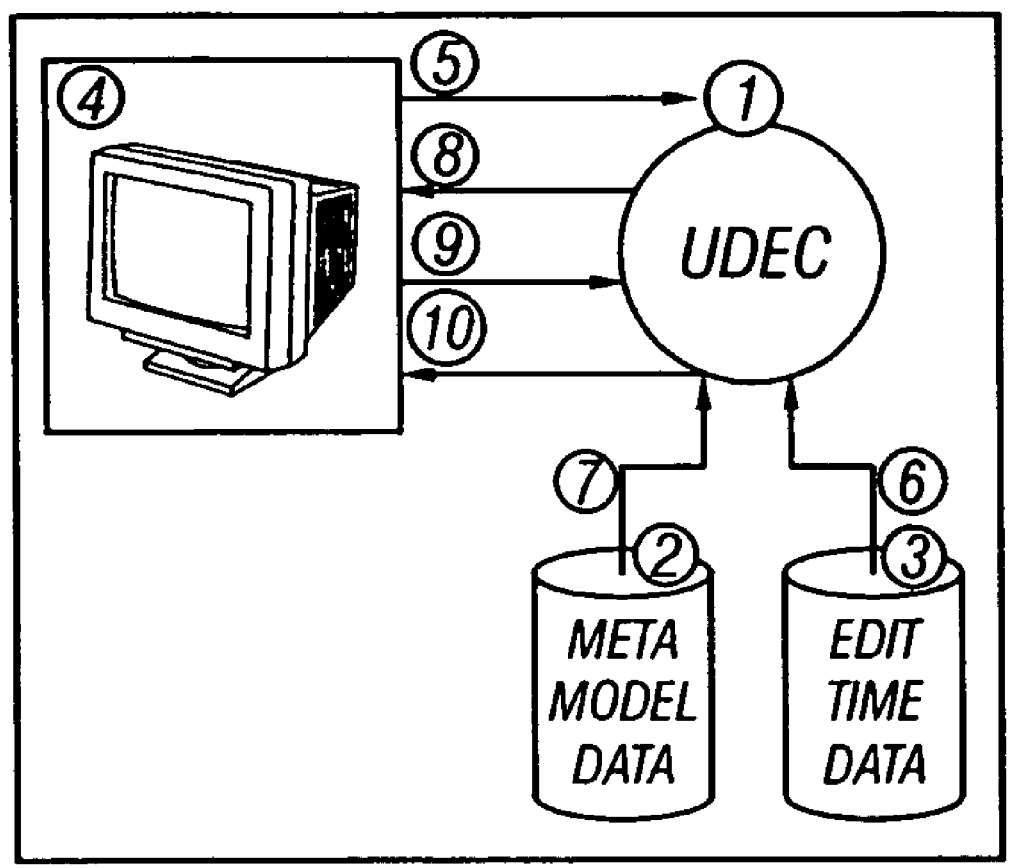
FIG. 1 is a computer display showing an overview of control flow in a user interaction with the system.

Within the field of object orientation, the concepts of encapsulation, polymorphism, and inheritance are well known. A Class is an embodiment of characteristics and behaviors. An instance of a Class is an object that exhibits the characteristics and behaviors of the Class. There are many well know and widely available references describing object oriented principles in great detail.

For the purposes of specification, it is useful to define some terms:

The meta model is a collection of object oriented software Classes that embody characteristics and behaviors that form the basis of the invention.

The meta-model includes the following object oriented software Classes: KDClass, KDMember, KDRelation, KDRelationLink, KDContext, KDElement, KDValue, KDTreeView, and KDTreeLevel.

KDClass is an object oriented software Class. It is a meta-level representation of a concrete object oriented software Class that is embodied in a "configurable processor" or other software object that uses data represented by objects.

| Field | Description |
| --- | --- |
| ModelID | Identifier to indicate which Model an instance of KDClass is part of. |
| ClassID | Unique Identifier for instances of the KDClass |
| ClassName | Name of the instance of KDClass |
| DBTableName | Name of the Database Table where instances of the KDClass are stored (optional). |
| XMLTagName | Name of the XML tag that delineates instances of the KDClass in an XML document (optional). |

KDMember is an object-oriented software Class. It is a meta-level representation of a data field present on a concrete object oriented software Class that is embodied in a "configurable processor" or other software object that uses data represented by objects.

| Field | Description |
| --- | --- |
| ModelID | Identifier to indicate which Model an instance of KDClass is part of. |
| ClassID | Identifier to indicate which instance of KDClass an Instance of KDMember is part of. |
| MemberID | Unique Identifier for instances of the KDMember. |
| MemberName | Name of the member that the instance of KDMember represents. |
| MemberType | Base type of the member (number, string, date, reference, list, long double, etc.) represented by the instance of KDMember. |
| DBFieldName | Name of the Database Column the member values are stored in. |
| XMLTagName | Tag to delineate member in XML documents. |

KDContext is an object oriented software Class. It is a representation of a set of KDElement and KDMember instances that taken together comprise an individual body of Edit Time Data.

| Field | Description |
| --- | --- |
| ContextID | Unique Identifier for instances of the KDContext class. |
| ModelID | Identifier to indicate which Model an instance of KDContext is based on. |
| ContextName | Name of the Context. |

KDElement is an object oriented software Class. It is a representation of an instance of a concrete object oriented software Class that is embodied in a "configurable processor" or other software object that uses data represented by objects.

| Field | Description |
| --- | --- |
| ContextID | Identifier to indicate which KDContext this KDElement is part of. |
| ElementID | Unique Identifier for instances of the KDElement Class. |
| ElementName | Name of the element (optional). |

KDValue is an object oriented software Class. It is a representation of an actual datum present on an instance of KDElement.

| Field | Description |
| --- | --- |
| ElementID | Identifier to indicate which KDElement this KDValue is part of. |
| MemberID | Identifier to indicate which KDMember on the KDElement this KDValue is holding the value for. |
| Value | The actual value |

KDRelation is an object oriented software Class. It is a representation of a relationship between instances of KDElement.

| Field | Description |
| --- | --- |
| ModelID | Identifier to indicate which Model an instance of KDRelation is part of. |
| RelationID | Unique Identifier for instances of the KDRelation Class. |

-continued

| Field | Description |
|---|---|
| ParentClassID | The parent Class of the KDRelation. |
| ChildClassID | The child Class of the KDRelation. |
| OwnerRelationID | Identifier of the KDRelation that owns this KDRelation (optional) |
| RelationTypeID | Identifier of the type of this KDRelation (Ownership, Distant2, Virtual, Recursive, Distant Recursive, or Virtual Distance Recursive.) |

KDRelationLink is an object oriented software Class. It is a representation of a relationship between instances of KDRelation. KDRelationLink facilitates the aggregation of instances of KDRelation into sophisticated composite relationships.

| Field | Description |
|---|---|
| ModelID | Identifier to indicate which Model this KDRelationLink is part of. |
| RelationLinkID | Unique Identifier for instances of the KDRelationLink Class. |
| OwnerRelationID | Identifier of the KDRelation that owns this KDRelationLink |
| RelationDirection | Direction of this KDRelationLink (up or down) |
| SeqID | Order of this KDRelationLink within a chain of KDRelationLinks |

KDTreeView is an object oriented software Class. It is a representation of a configuration of a hierarchical view of Edit Time Data.

| Field | Description |
|---|---|
| ModelID | Identifier to indicate which Model an instance of KDTreeView is part of. |
| TreeViewID | Unique Identifier for instances of the KDTreeView Class. |
| TreeViewCaption | Caption for the display of an instance of KDTreeView. |
| TreeViewType | Identifier of the Type of an instance of KDTreeView (Knowledge or Template) |

KDTreeLevel is an object oriented software Class. It is a representation of a configuration that facilitates display of levels of hierarchical Edit Time Data in a view.

| Field | Description |
|---|---|
| ModelID | Identifier to indicate which Model an instance of KDTreeLevel is part of. |
| TreeViewID | Identifier to indicate which instance of KDTreeView the Instance of KDTreeLevel is part of. |
| TreeLevelID | Unique Identifier for instances of the KDTreeLevel Class. |
| TreeLevelParentID | Identifier of the Parent KDTreeLevel of an instance of KDTreeLevel |
| SeqID | The order an instance of KDTreeLevel is displayed in beneath its Parent KDTree Level |
| FolderCaption | The caption that is to be displayed in a folder holding instances of KDElement. (optional) |
| TreeLevelType | Identifier of the type of an instance of KDTreeLevel (Repository, ChildList, Template, Recursive) |
| RelationID | Identifier of the instance of KDRelation that controls the instance of KDTreeLevel (optional) |
| ClassID | Identifier of the instance of KDClass that controls the instance of KDTreeLevel (optional) |

Meta Model Data consists of instantiations of the KDClass, KDMember, KDRelation, KDRelationLink, KDTreeView, and KDTreeLevel Meta Model classes. A cohesive body of Meta Model Data makes up a Model and can completely represent an Edit Time Model.

Edit Time Model refers to a set of Classes and Constraints thereon that are accepted by a "configurable processor" or other software object that uses data represented by objects. An Edit-time model can be completely represented by Meta Model Data.

Edit Time Data consists of instantiations of Edit Time Model classes. A cohesive body of Edit Time Data makes up a Context and can completely specify configuration data for use by a "configurable processor" or other software object that uses data represented by objects. Edit time data can be completely represented by instantiations of the KDElement and KDValue classes. The editing expert system keeps the formations of Edit Time data valid by enforcing constraints represented in the Meta Model Data.

Run Time Data consists of input data for use by a "configurable processor" or other software object that uses data represented by objects. The "configurable processor" operates on run-time data to produce desired results as specified therein.

Result Data consists of output data or results from a "configurable processor" or other consumer of structured data.

| LIST OF SYSTEM COMPONENTS |
|---|
| Interfaces |
| KD_Admin |
| KD_DesignCore |
| KD_Designer |
| KD_Driver |
| KD_Engine |
| KD_MDI_Ctl |
| KD_MDI_Form |
| KD_ModelProfile |
| KD_ModuleInfo |
| KD_Packager |
| KD_ProjectProfile |
| KD_StudioSink |
| KD_Wizard |
| KD_Class |
| KD_Context |
| KD_Element |
| KD_Icon |
| KD_Option |
| KD_Scope |
| KD_Style |
| KD_SubType |
| KD_TreeLevel |
| KD_TreeView |
| KD_WkbEngine |
| KD_WkbExtender |
| KD_WkbTreeSink |
| KD_ElementEditor |
| Operation |

The present invention allows the user to interact with the system to edit edit-time data. In FIG. 1, a Viewer and Controller for Universal Data Editor Component (VCUDEC) 4 is coupled with a Universal Data Editor Component (UDEC) 1 and meta-model data 2. The user initiates an edit session and requests the load of edit time data 3 in the VCUDEC 4. The UDEC loads the requested edit-time data as in 6. The UDEC loads the meta model data specified in the edit time data 7. The UDEC causes the edit time data to be displayed to the user 8 in the VCUDEC. The user begins an edit action in the VCUDEC. The edit action descriptors are sent to the UDEC 9. The UDEC validates the edit action and returns a status code and support message to the VCUDEC, which displays the support message to the user as well as visual cues indicating the outcome of the edit action as specified by the status code 10.

Figure 2:
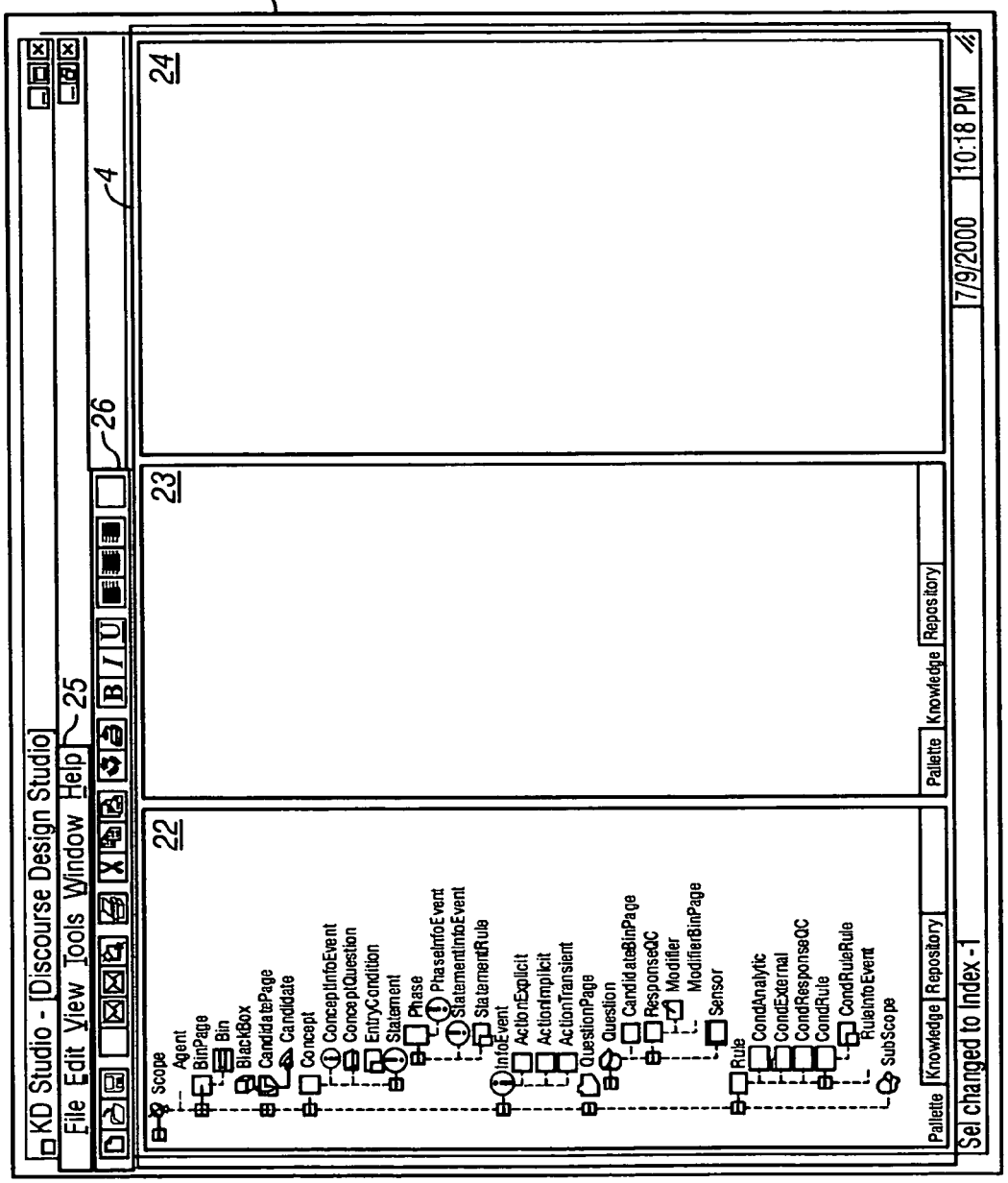
FIG. 2 is a schematic diagram of a DragDrop Interface displaying a representation of an edit time model before any edit time data is loaded.

The present invention is comprised of a Universal Data Editing, Testing, and Management Environment with extensibility (UDETME) that can dynamically load editing, testing, and management components. FIG. 2 shows a VCUDEC in accordance with a preferred embodiment. UDETME 21 has loaded VCUDEC 4. A visual representation of instantiations of meta model data is displayed for the user 22 in a pane of VCUDEC. When the user selects a body of edit time data it will be visually represented to the user 23 and individual instances of edit time data objects will be visually represented 24. A menu bar 25 and toolbar 26 allow the user to issue edit commands from the UDETME that are handled by a dynamically loaded component that has focus, in this case, UDEC.

Figure 3:
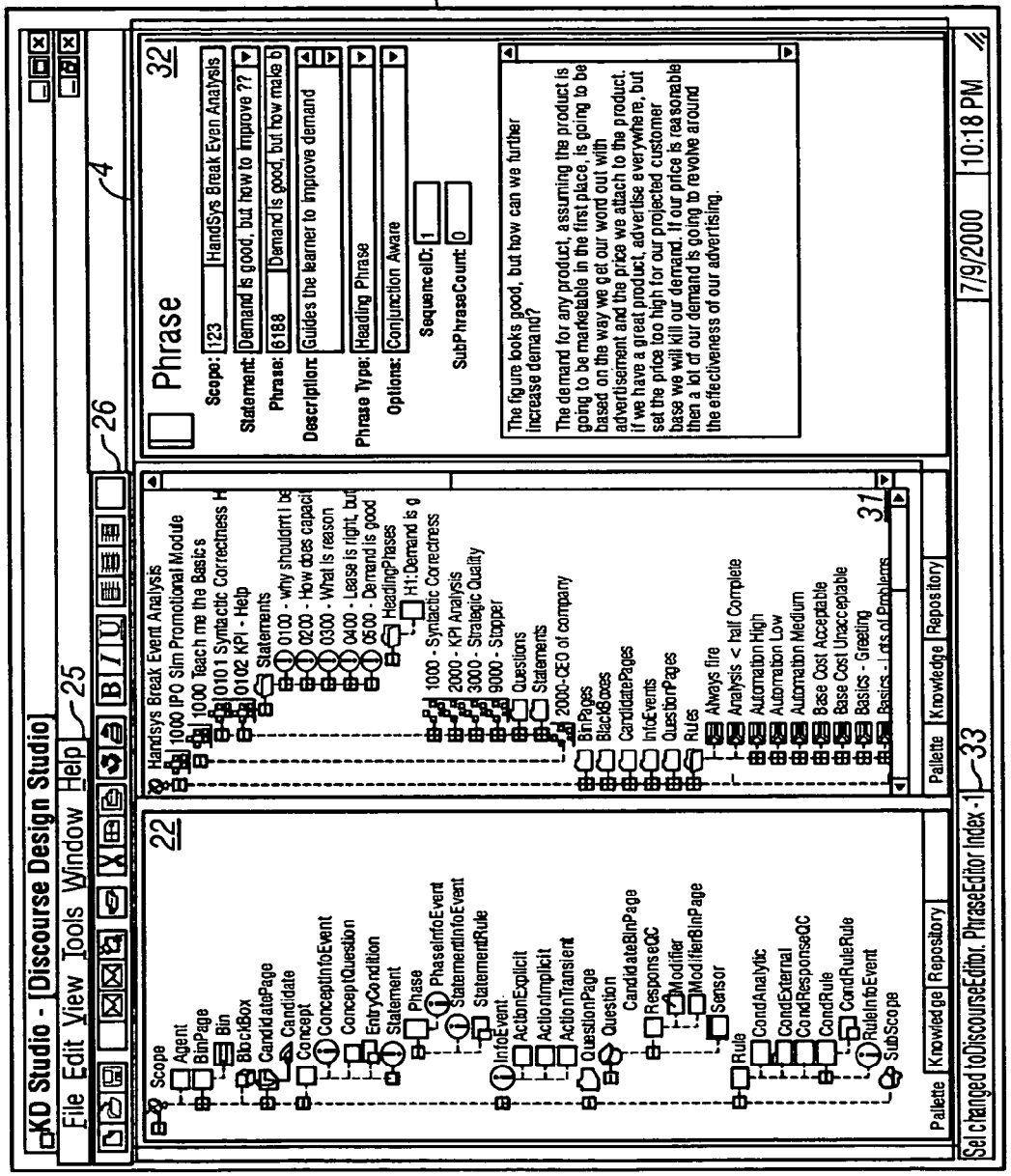
FIG. 3 is a computer display showing a DragDrop Interface displaying a representation of an edit time model and a representation of a selection of edit time data and a detail view of a selected element.

FIG. 3 shows a VCUDEC, dynamically loaded by the UDETME, and populated with a visual representation of meta model data and edit time data in accordance with a preferred embodiment. UDETME 21 has loaded a VCUDEC 4. A visual representation of instantiations of meta model data is displayed for the user 22 in a pane of VCUDEC. A KDContext of edit time data is displayed 31 and the details of the selected instances from the edit time data is displayed 32. A menu bar 25 and toolbar 26 allow the user to issue edit commands.

Figure 4:
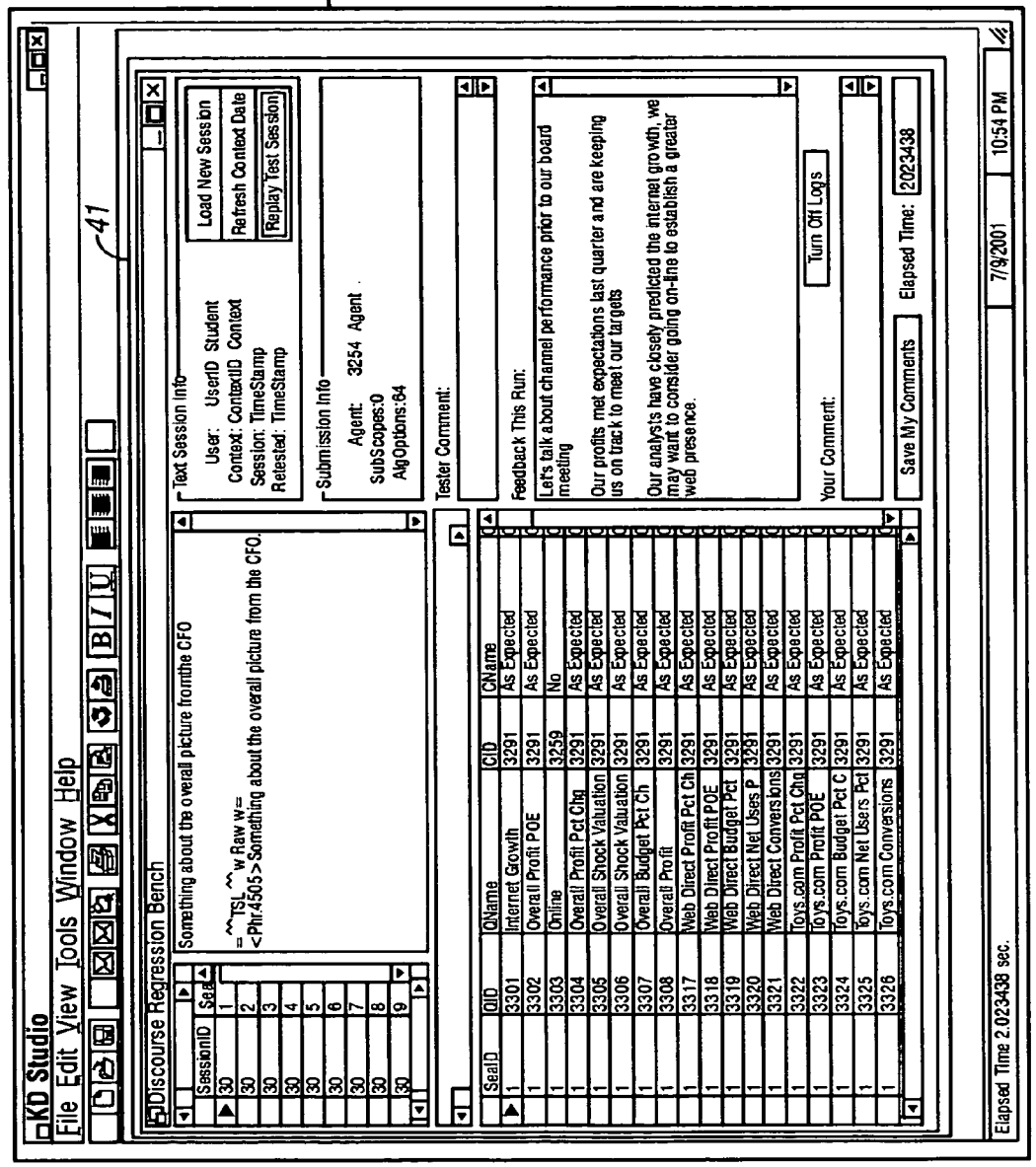
FIG. 4 is a computer display showing a Universal Data Editing, Testing, and Management Environment showing a dynamically loaded regression testing component.

The present invention can dynamically load a plurality of testing components. FIG. 4 shows UDETME 21 with dynamically loaded regression tester component 41 in accordance with a preferred embodiment. The regression testing component is used to test formations of edit time data against a "configurable processor".

Figure 5:
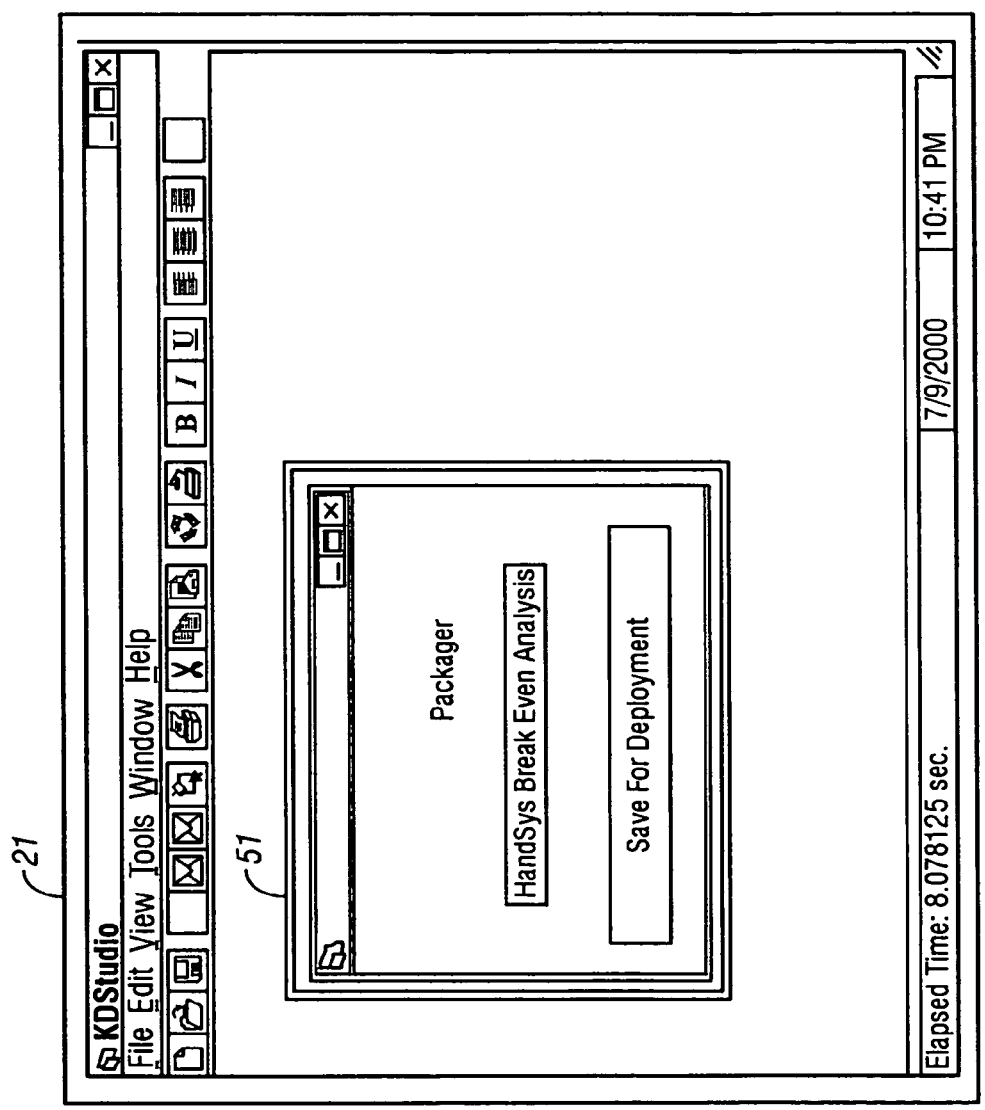
FIG. 5 is a computer display showing a Universal Data Editing, Testing, and Management Environment showing a dynamically loaded Data Packager and Deployment component.
Figure 6A:
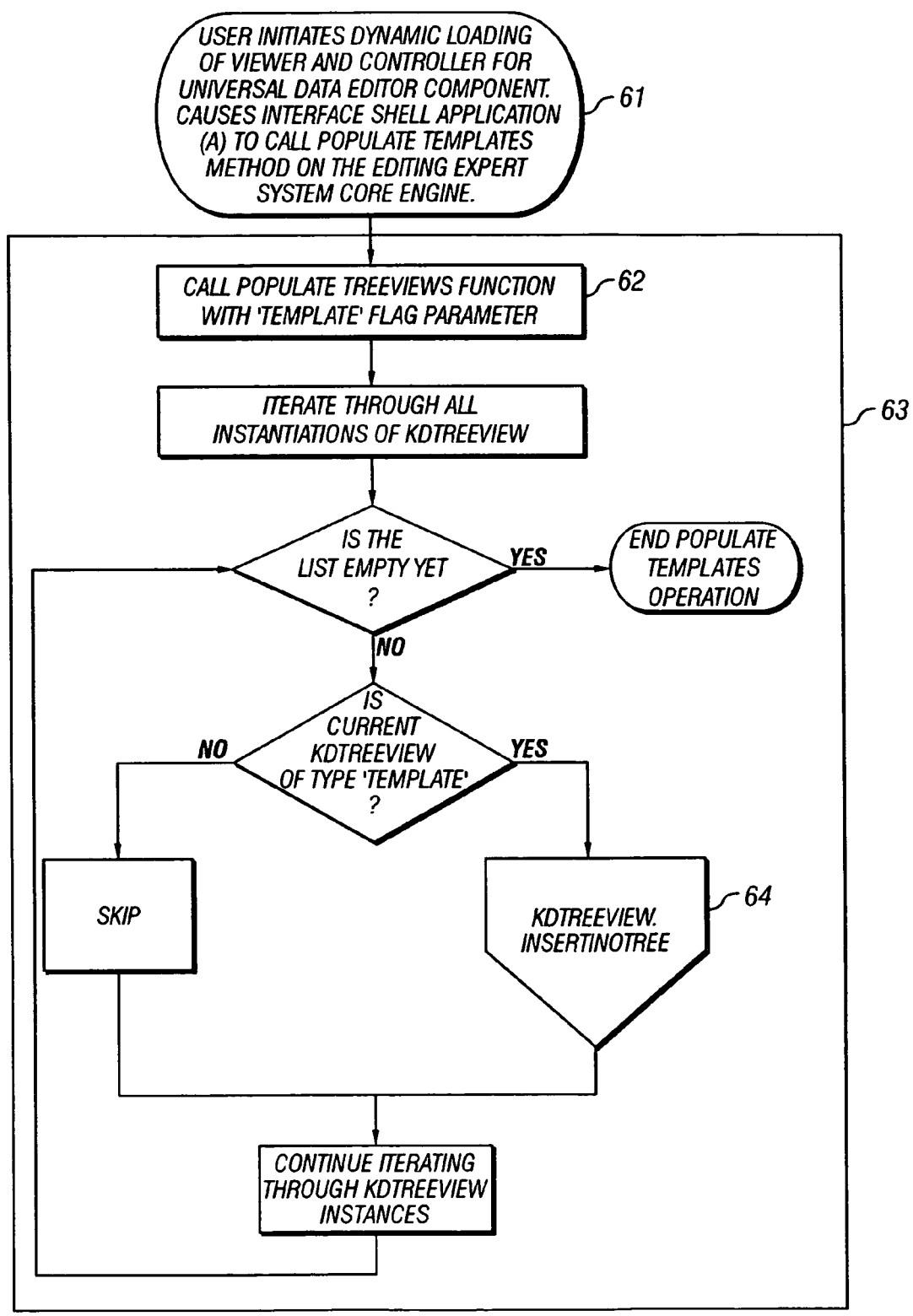
FIGS. 6A–J are computer flow charts showing an interface shell application called the PopulateTemplates function on the editing expert system core engine to cause the display of meta model data instances. The PopulateTemplates function traverses instances of KDTreeView and KDTreeLevel as well as instances of KDRelation and KDRelationLink to derive and display the desired formation of data, and an interface shell application which is called the PopulateData function on the editing expert system core engine to cause the display of edit time data instances. The PopulateData function traverses instances of KDTreeView and KDTreeLevel as well as instances of KDRelation, KDRelationLink, and KDElement to derive and display the desired formation of data.
Figure 6B:
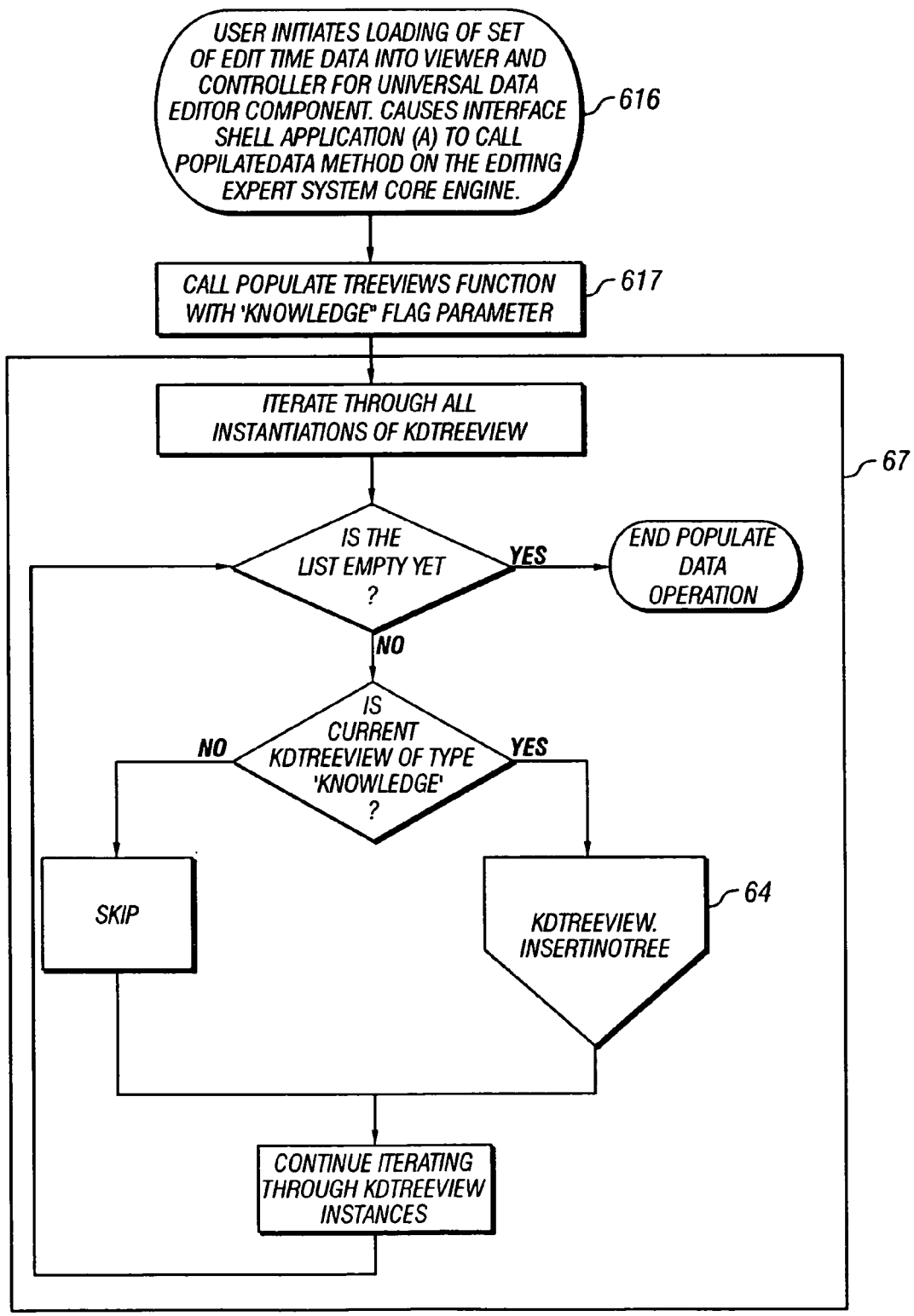
Figure 6C:
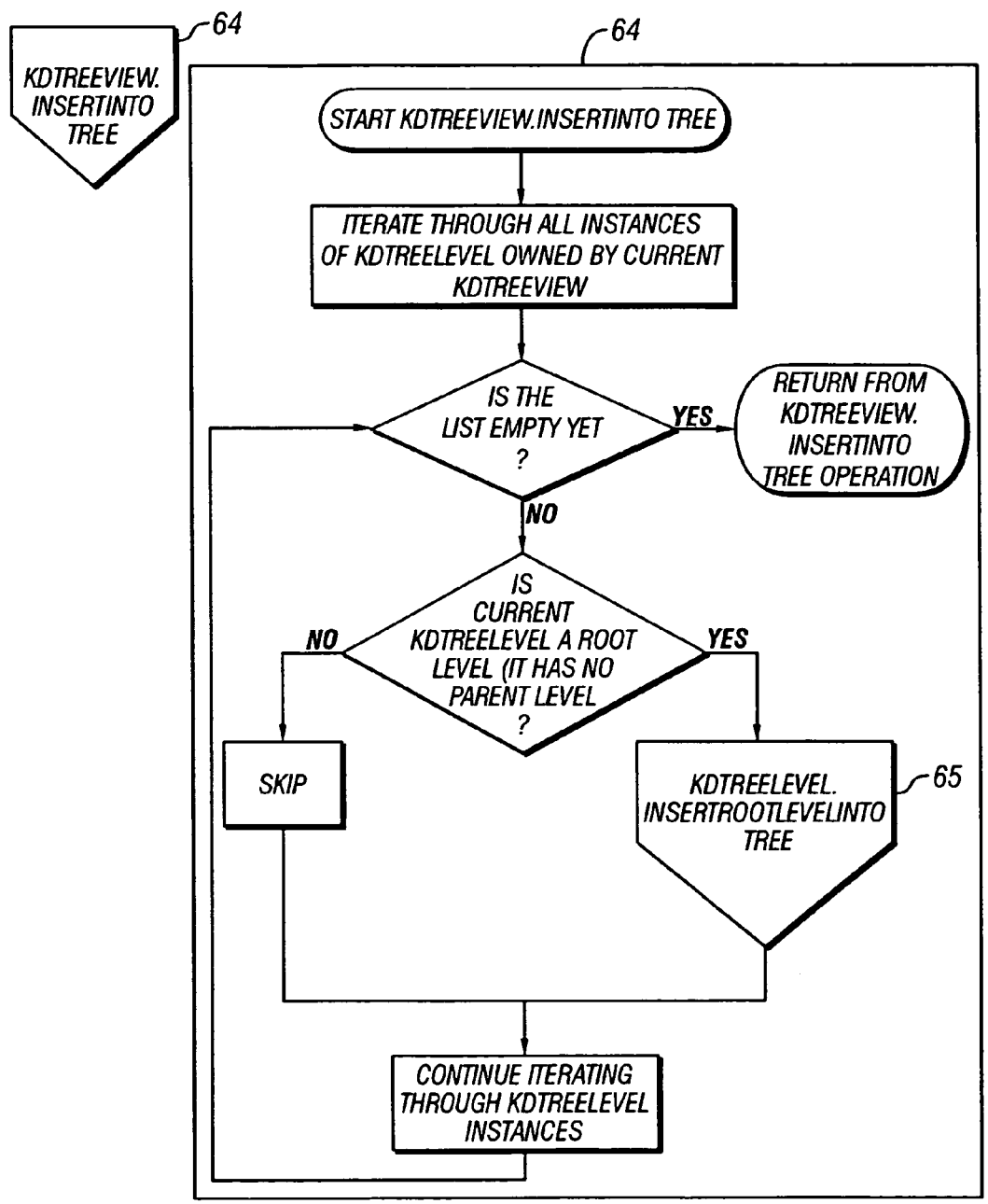
Figure 6D:
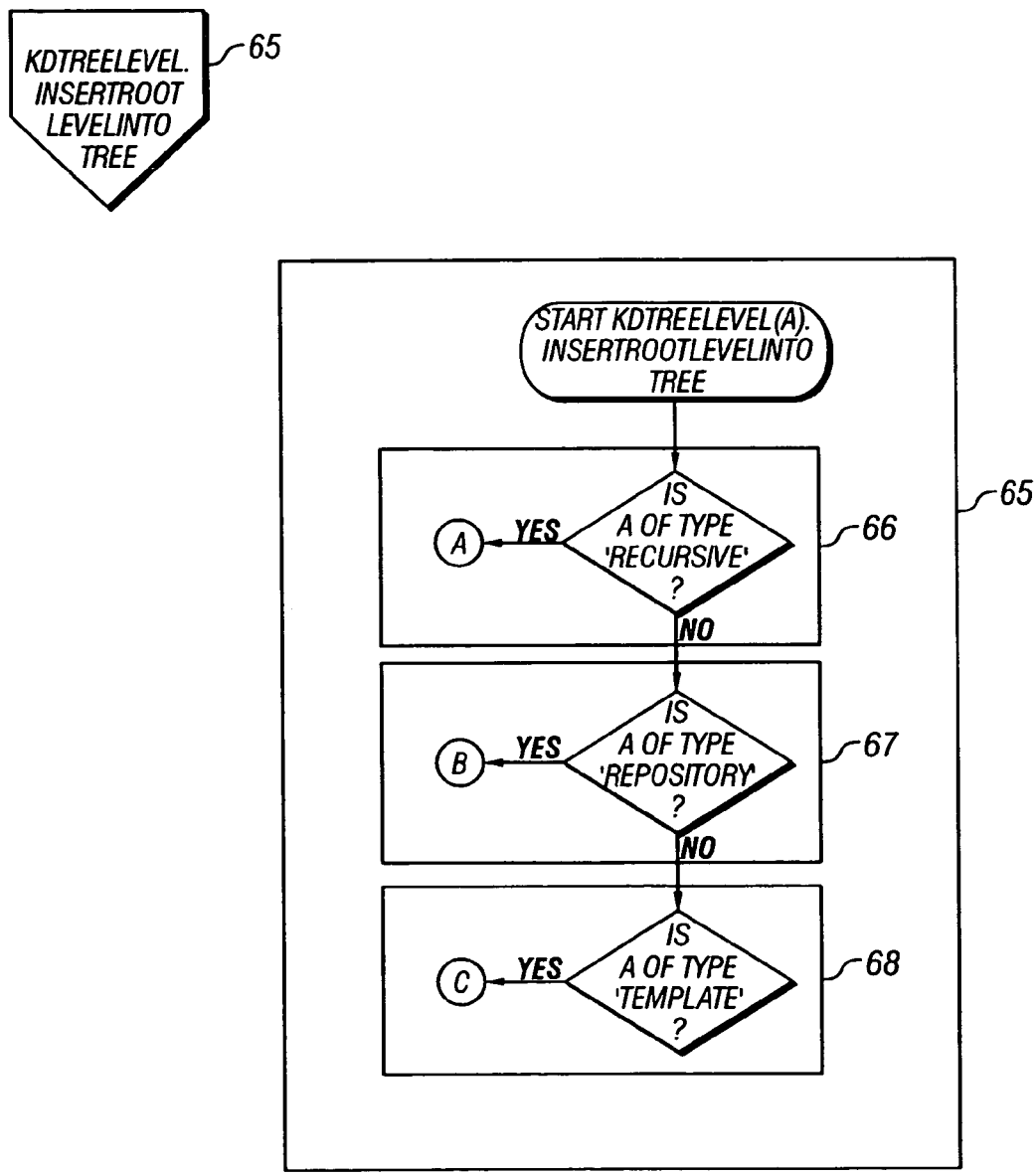
Figure 6E:
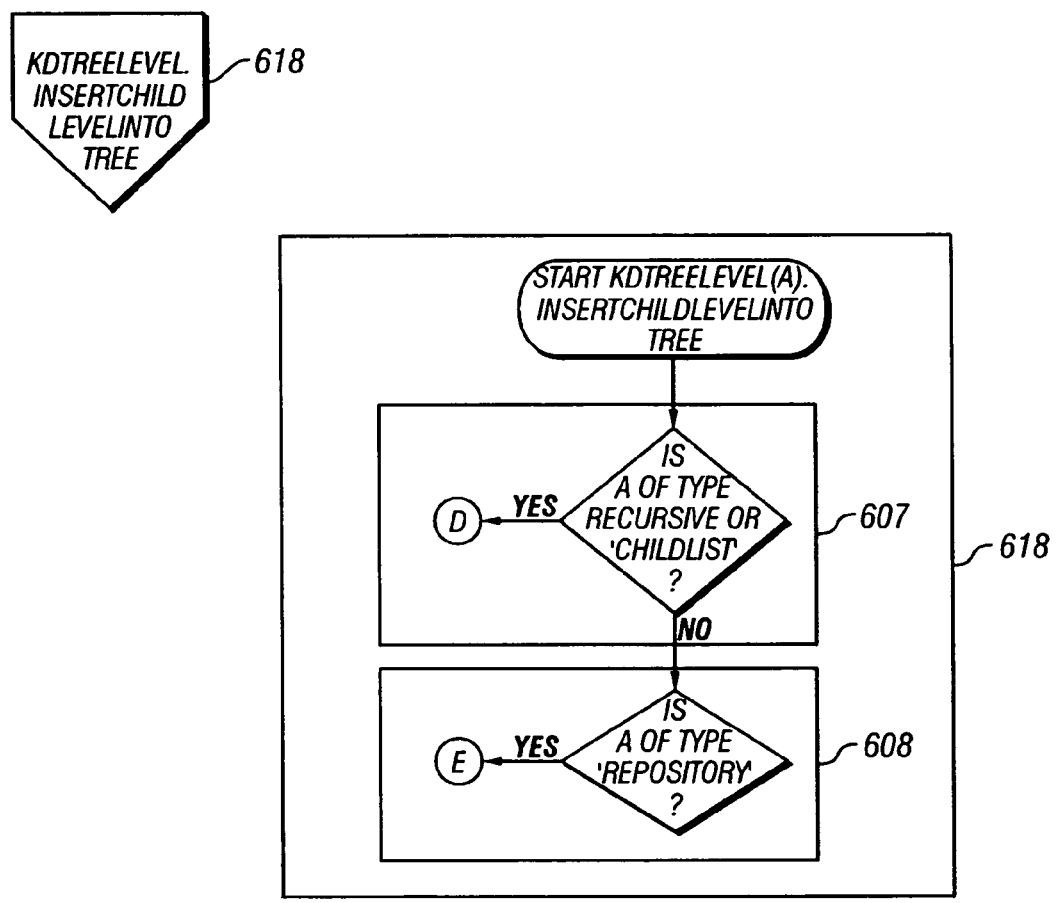
Figure 6F:
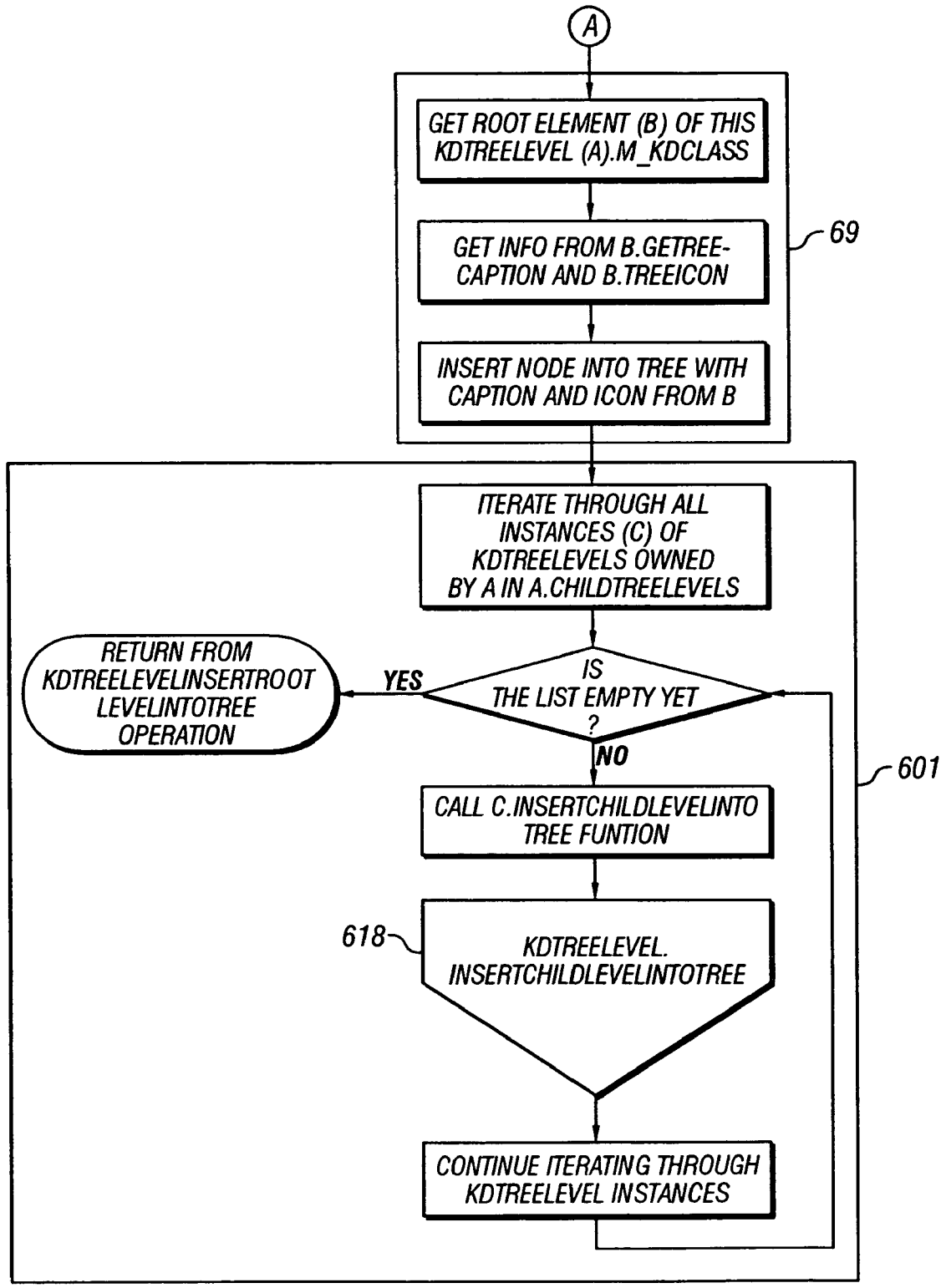
Figure 6G:
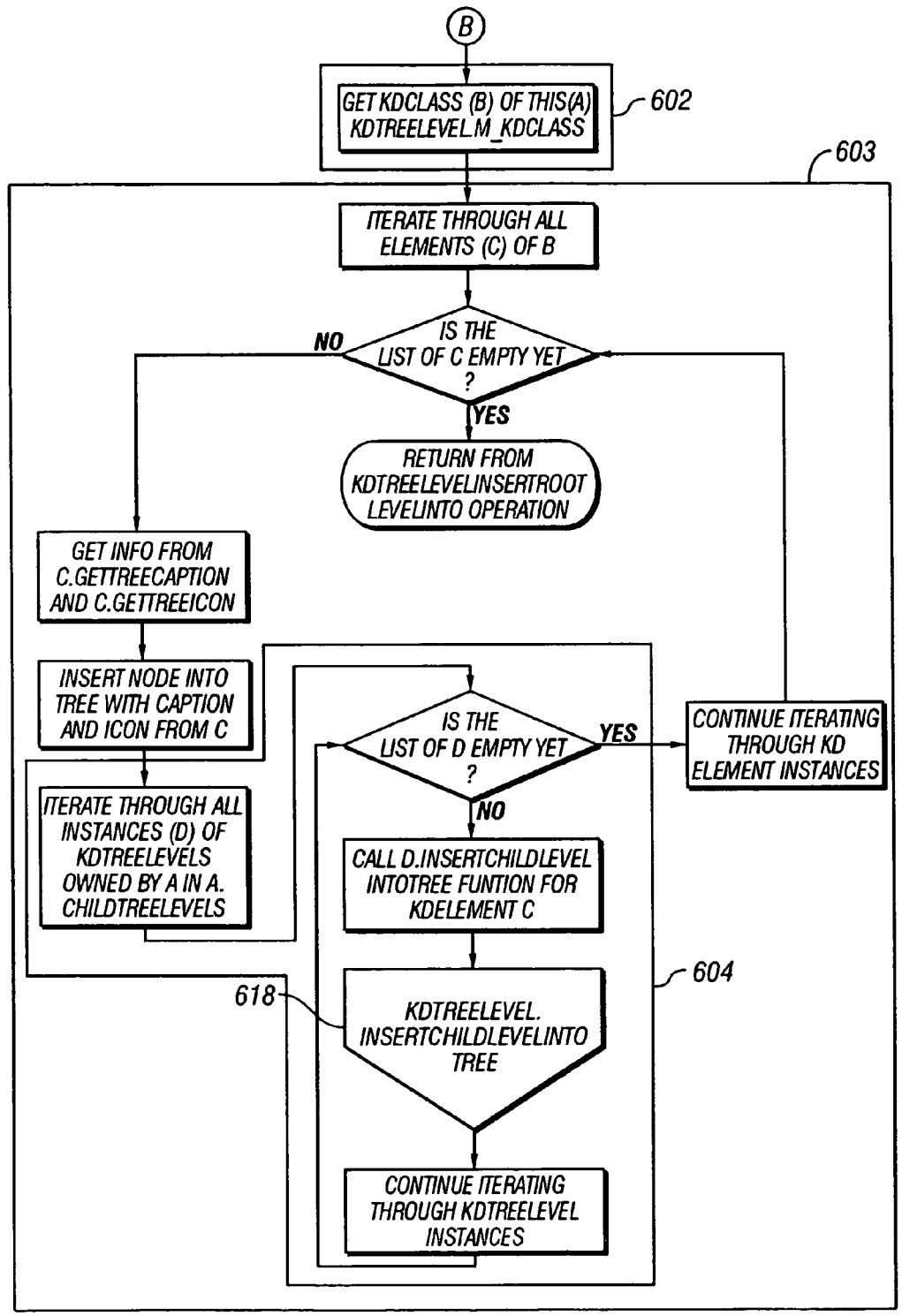
Figure 6H:
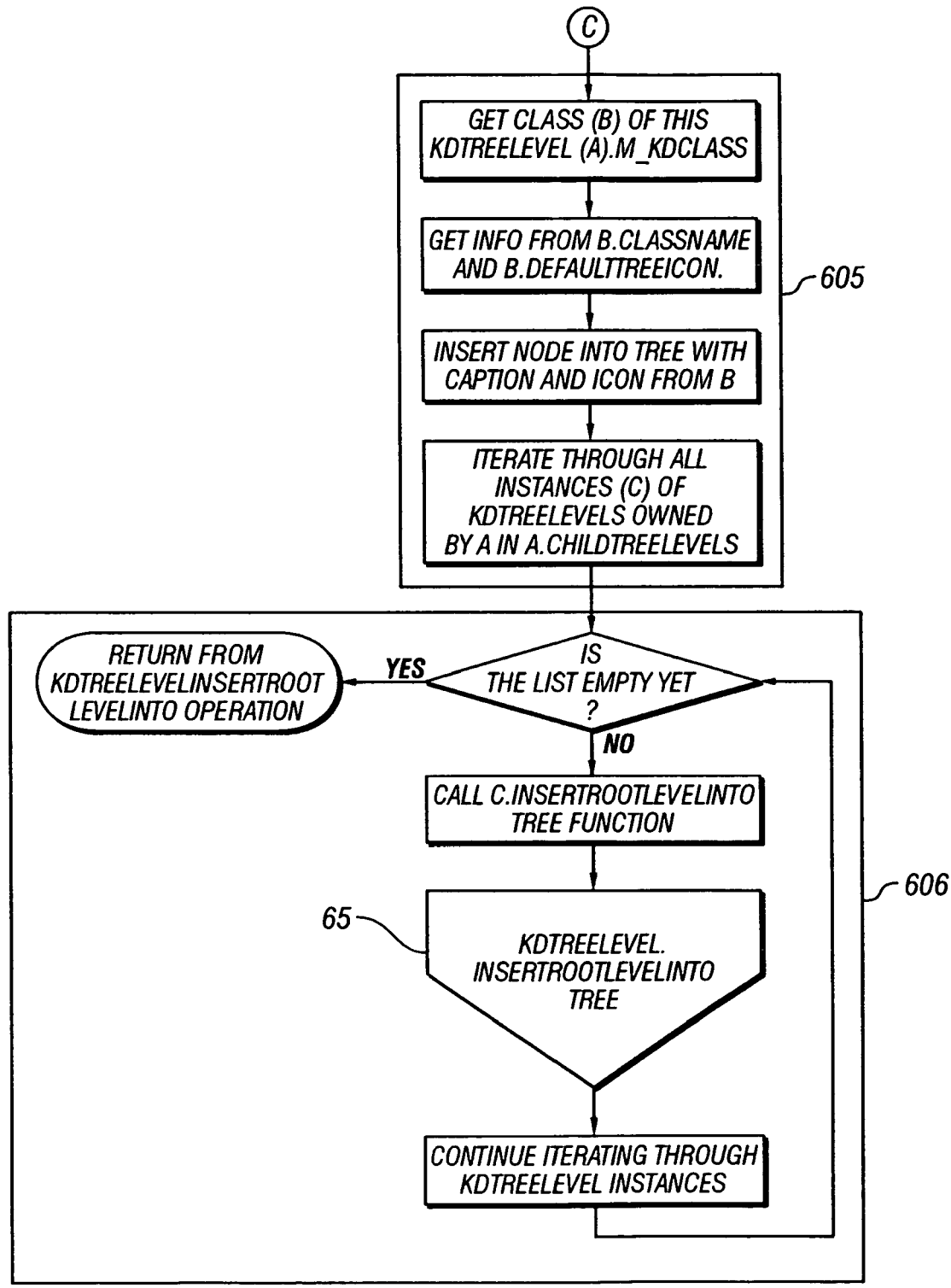
Figure 6I:
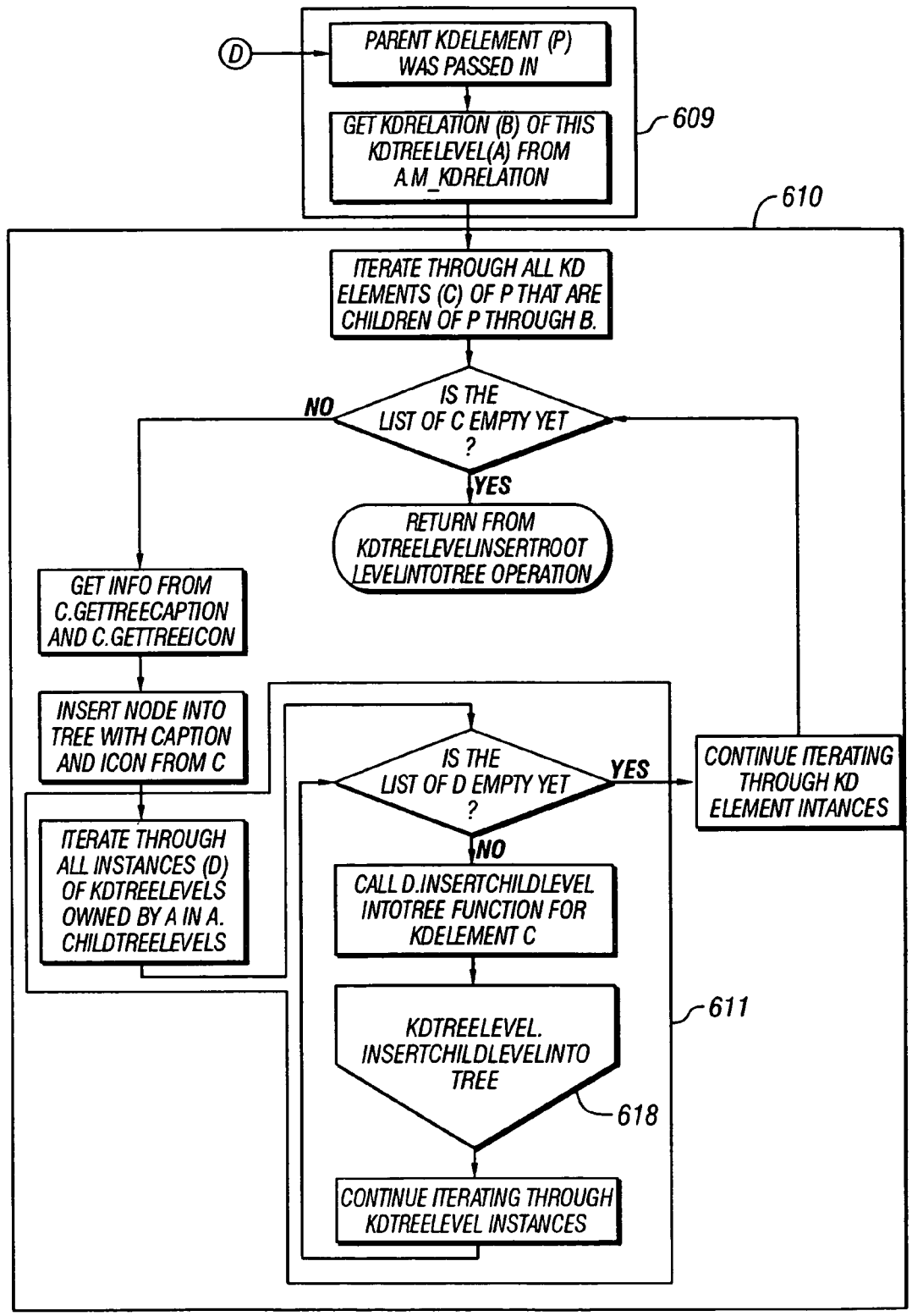
Figure 6J:
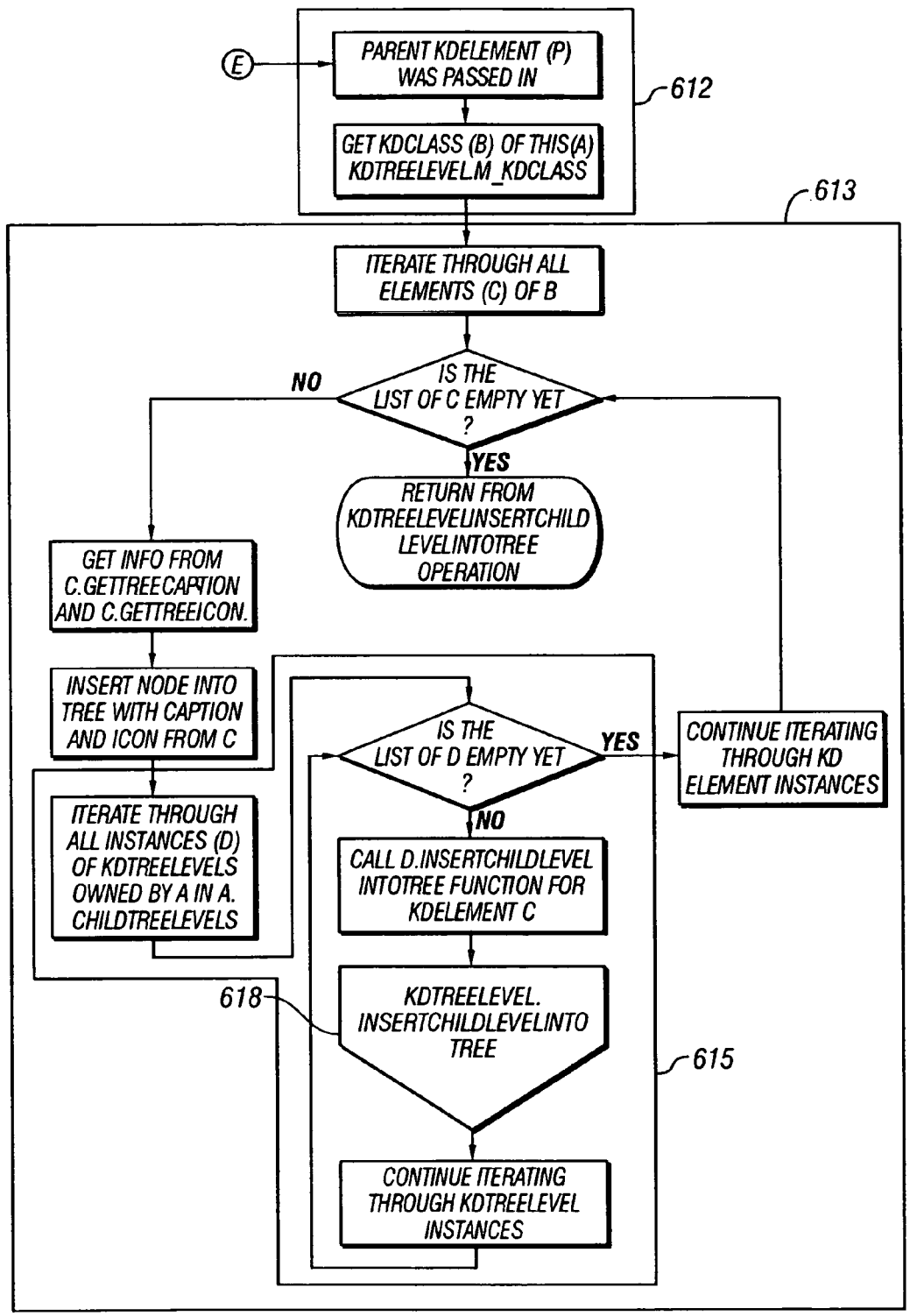

The present invention can dynamically load a plurality of Packaging and Deployment components. FIG. 5 shows UDETME 21 with dynamically loaded Packaging and Deployment component 51 in accordance with a preferred embodiment. The Packaging and Deployment component causes the edit time data to be stored in a variety of data formats, including appropriate format for loading by a "configurable processor".

To initiate an editing session, the user issues a command in the UDETME to load a VCUDEC by pushing the corresponding toolbar button or selecting the corresponding menu item. Similarly, the user selects a KDContext for loading. The instances of the meta model data and edit-time data are visually represented to the user in the VCUDEC. Because the meta model data and edit time data are both structural formations of data that follow similar rules of construction, the process for representing them each visually in an interface is nearly identical, with only minor variations. FIG. 6 displays this process.

The display of meta model data occurs when the user initiates the loading of a meta model in the UDETME 61. The UDETME passes the command to the VCUDEC, which calls the PopulateTemplates method on the UDEC, which calls its internal PopulateTreeViews method with the 'Template' flag parameter 62. The PopulateTreeViews method iterates through all the instances of KDTreeView defined for the current meta model and calls the InsertIntoTree method (described in more detail later in this section) for each instance of KDTreeView marked as type Template, and ignoring instances of KDTreeView marked as type 'Knowledge' 63.

Similarly, the display of edit time data occurs when the user initiates the loading of a KDContext of edit time data in the UDETME 616. The UDETME passes the command to the VCUDEC, which calls the PopulateTemplates method on the UDEC, which calls its internal PopulateTreeViews method with the 'Knowledge' flag parameter 617. The PopulateTreeViews method iterates through all the instances of KDTreeView defined for the current meta model and calls the InsertIntoTree method (described in more detail later in this section) for each instance of KDTreeView marked as type 'Knowledge', and ignoring instances of KDTreeView marked as type 'Template' 67.

The UDEC causes each KDTreeView instance to be represented in the VCUDEC by a similar process, whether it is of type 'Knowledge' or of type 'Template'. The InsertIntoTree method iterates over the instances of KDTreeLevel owned by the instance of KDTreeView. Owned instances of KDTreeLevel that are root level (they have no value set for TreeLevelParentID) are inserted 64 into the tree with the recursive KDTreeLevel.InsertRootLevelIntoTree method 65. If the instance has a value set for TreeLevelParentID, then it is ignored in this stage.

The UDEC causes each root level instance of KDTreeLevel to be represented in the VCUDEC by a process based on the TreeLevelType of the instance, either 'Recursive' 66, 'Repository' 67, or 'Template' 68. By definition, root level instances of KDTreeLevel cannot be of type 'ChildList'.

If the root KDTreeLevel instance is of type 'Recursive' 66, then information about the root-most instance of the KDElement at this KDTreeLevel is extracted from the edit time data by finding the instance of KDElement that has no parent element. The UDEC causes the VCUDEC to display the visual representation of the root-most instance 69. Then, the recursive function KDTreeLevel.InsertChildLevelIntoTree 618 is called for each instance of KDTreeLevel owned by the current root 'Recursive' instance of KDTreeLevel 601.

If the root KDTreeLevel instance is of type 'Repository' 67, then information about the instance of KDClass at this KDTreeLevel is extracted from the meta model data 602. The UDEC iterates through and causes the VCUDEC to display the visual representation of each instance of KDElement defined for the instance of KDClass 603. Inside this iteration, the recursive method KDTreeLevel.InsertChildLevelIntoTree 618 is called for each instance of KDTreeLevel owned by the current root 'Repository' instance of KDTreeLevel 604.

If the root KDTreeLevel instance is of type 'Template' 68, then information about the instance of KDClass at this KDTreeLevel is extracted from the meta model data. The UDEC causes the VCUDEC to display the visual representation of the instance of KDClass represented by the KDTreeLevel 605. Then the recursive function KDTreeLevel.InsertRootLevelIntoTree 65 is called for each instance of KDTreeLevel owned by the current root 'Template' instance of KDTreeLevel 606.

The UDEC causes the VCUDEC to represent each non-root KDTreeLevel instance under its parent KDTreeLevel based on its TreeLevelType. The recursive method KDTreeLevel.InsertChildLevelIntoTree 618 is used to visually represent all non-root, non-template-type instances of KDTreeLevel. The method has two branches of operation depending on whether the TreeLevelType is 'Recursive' or 'ChildList' 607, or 'Repository' 608.

If the non-root, non-template-type instance of KDTreeLevel is of type 'Recursive' or type 'ChildList' 607, then information about the instance of KDRelation (B) associated with the current KDTreeLevel is extracted from the meta model data 609. The UDEC iterates through all instances of KDElement that are children of the current KDElement through KDRelation B, extracts information from them, and causes the VCUDEC to visually represent them 610. The same recursive method KDTreeLevel.InsertChildLevelIntoTree 618 is called for each instance of KDTreeLevel owned by the current type 'Recursive' or 'ChildList' type instance of KDTreeLevel 611.

If the non-root, non-template-type instance of KDTreeLevel is of type 'Repository' 608, then information about the instance of KDClass at this KDTreeLevel is extracted from the meta model data 612. The UDEC iterates through and causes the VCUDEC to visually represent each instance of KDElement defined for the instance of KDClass 613. Inside this iteration, the recursive method KDTreeLevel.InsertChildLevelIntoTree 618 is called for each instance of KDTreeLevel owned by the current non-root 'Repository' instance of KDTreeLevel 615.

Figure 7:
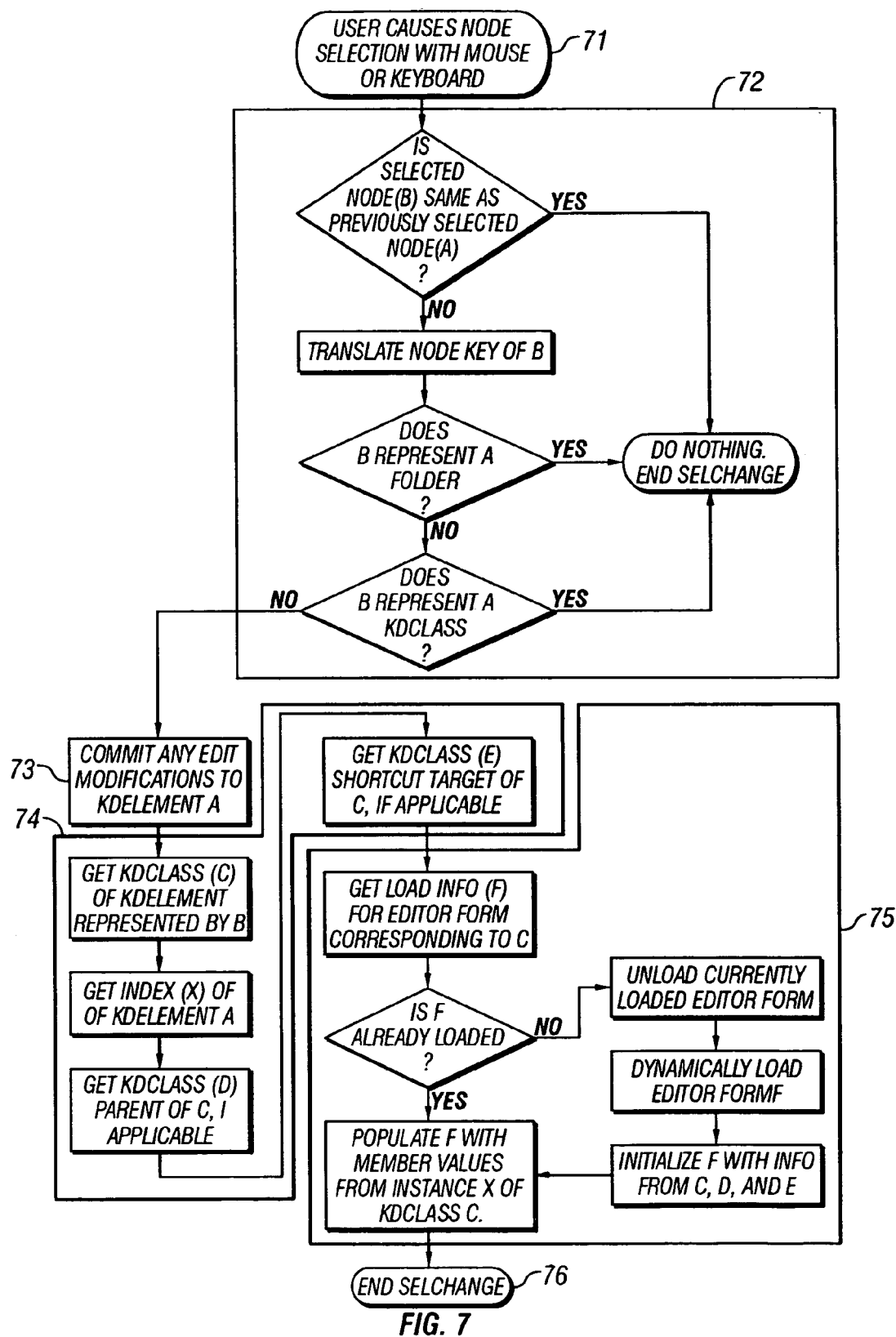
FIG. 7 is a flow chart showing that when the user causes a node to be selected, either through a mouse or keyboard action, the interface shell application calls the SelChange function on the editing expert system core engine. The editing expert system core engine examines the selected node and causes it to be displayed in a detail editor that is dynamically loaded specifically for the selected element.
Figure 8A:
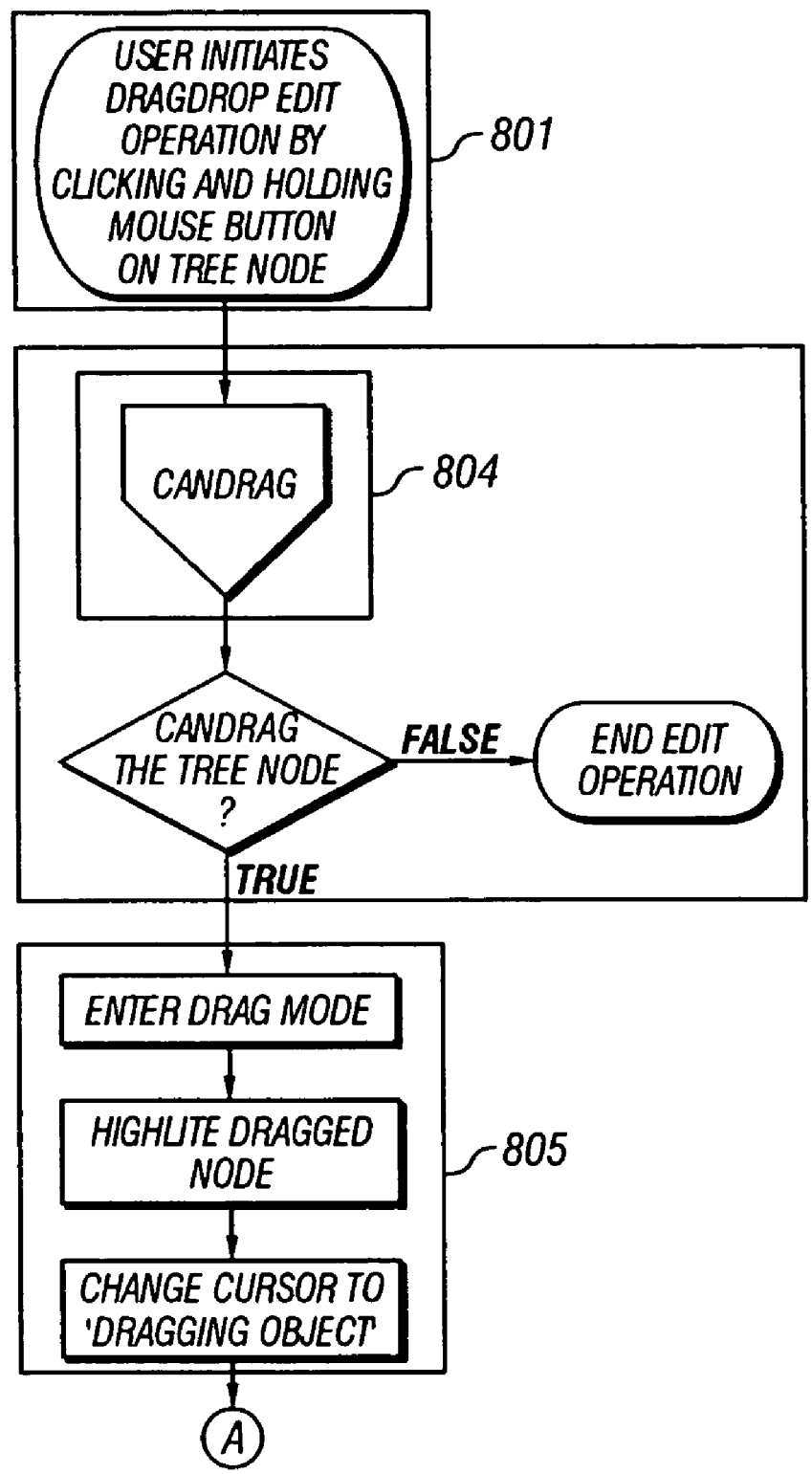
FIGS. 8A–B are flow charts showing an overall view of the drag/drop edit operation.
Figure 8B:
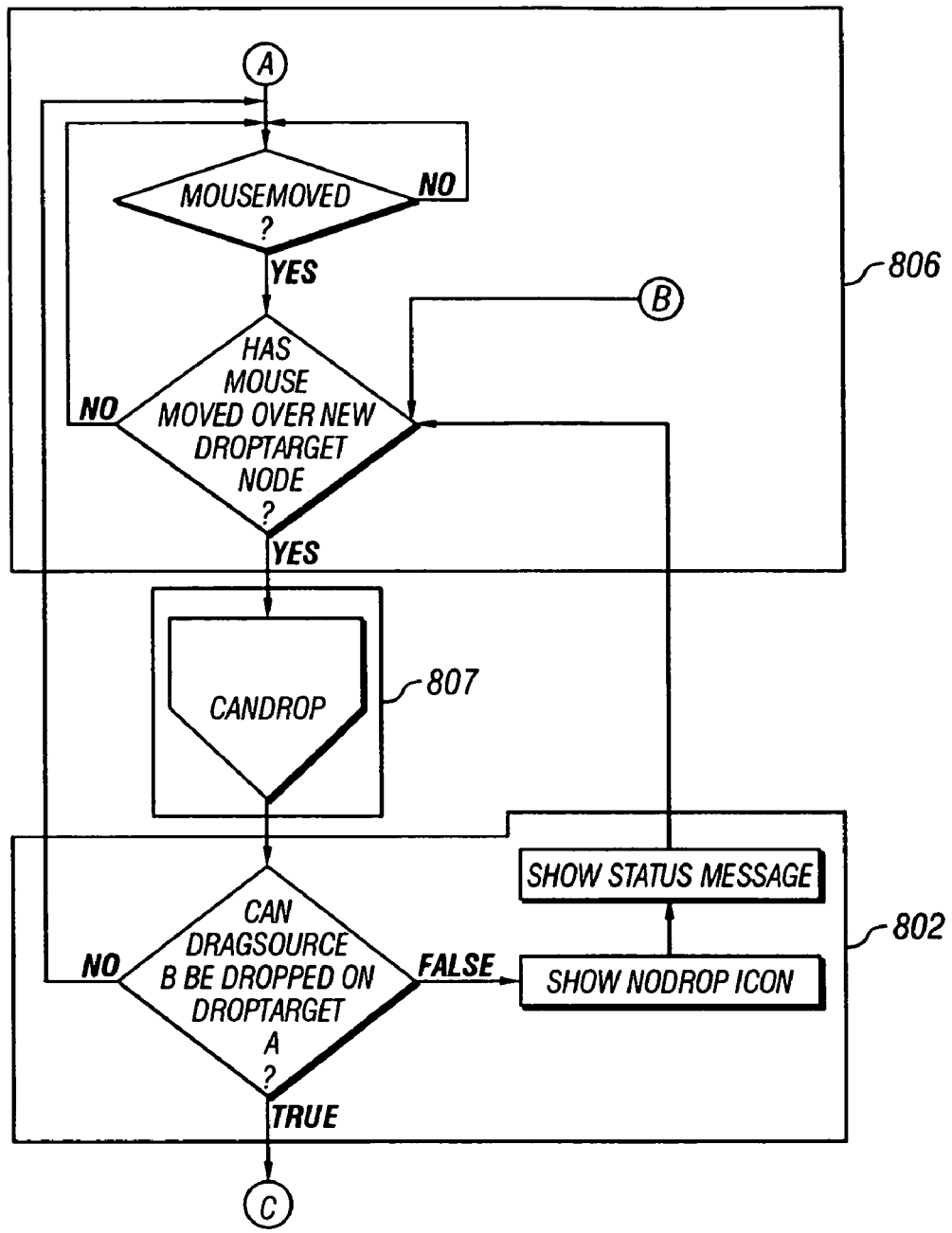
Figure 8C:
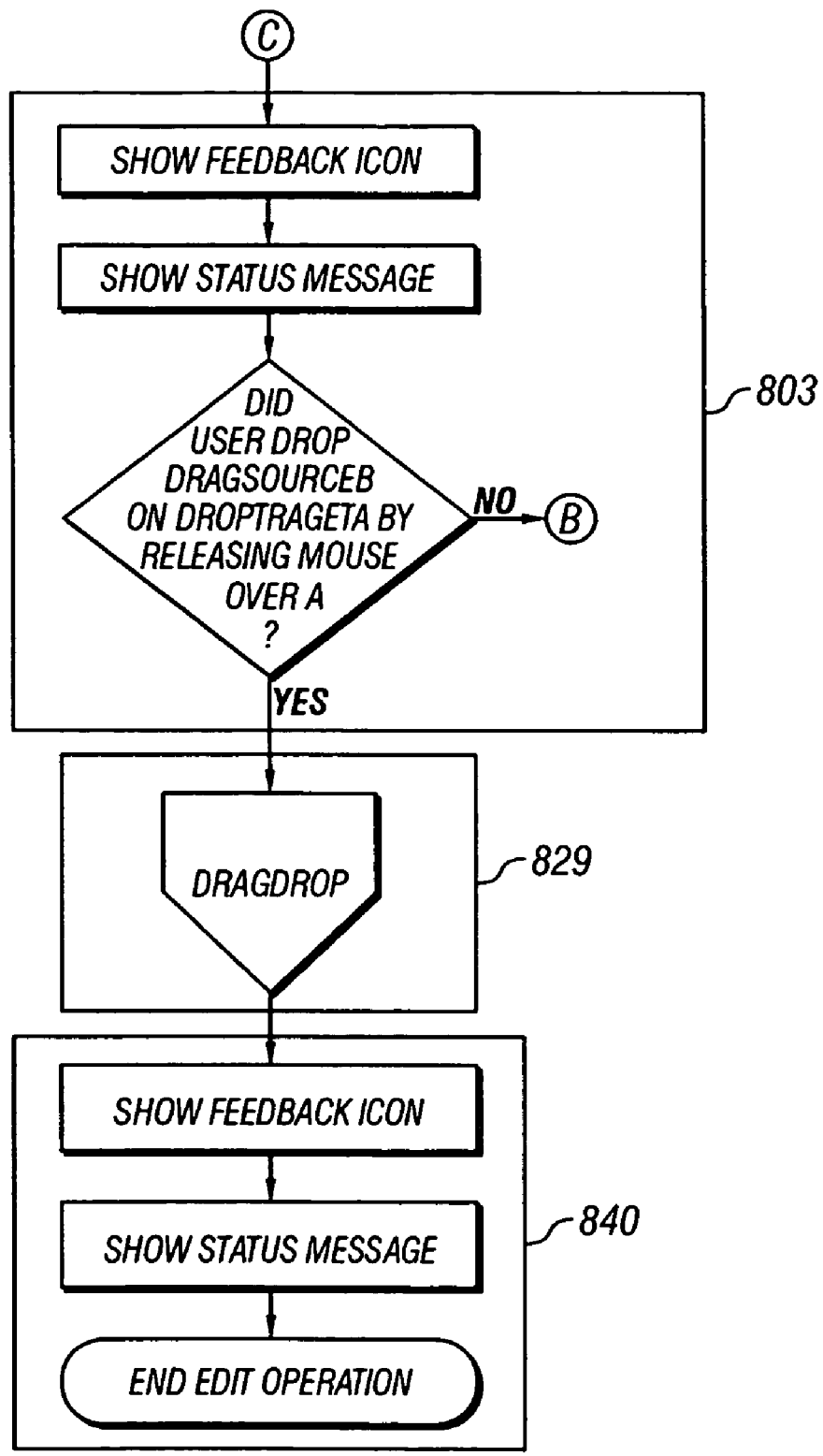
FIGS. 8C–D are flow charts showing that when the user attempts to initiate an edit operation by dragging an element in the tree view interface, the interface shell application calls the CanDrag function on the editing expert system core engine. The interface shell passes information about the node the user is attempting to drag. The editing expert system core engine analyzes the node and determines whether the user should be allowed to drag the node. CanDrag returns a Boolean indicating whether the node is draggable. If the return value indicates that the node is draggable, interface shell enters dragging mode and allows the user to continue the drag operation.
Figure 8D:
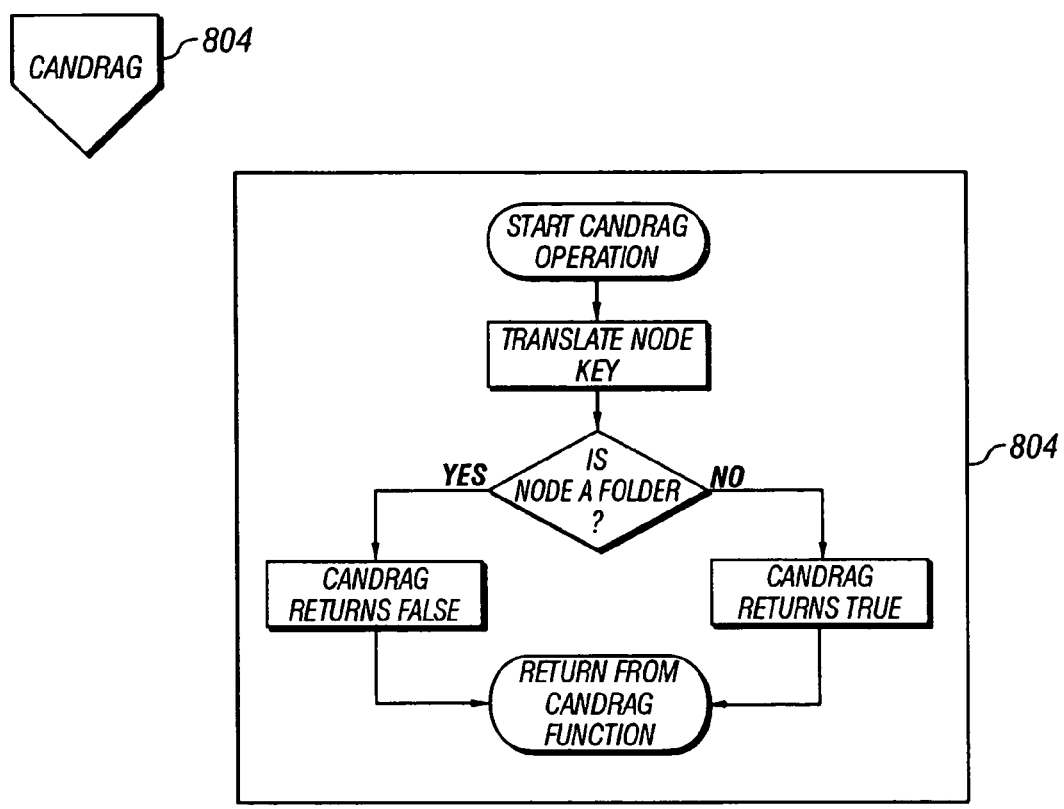
Figure 8E:
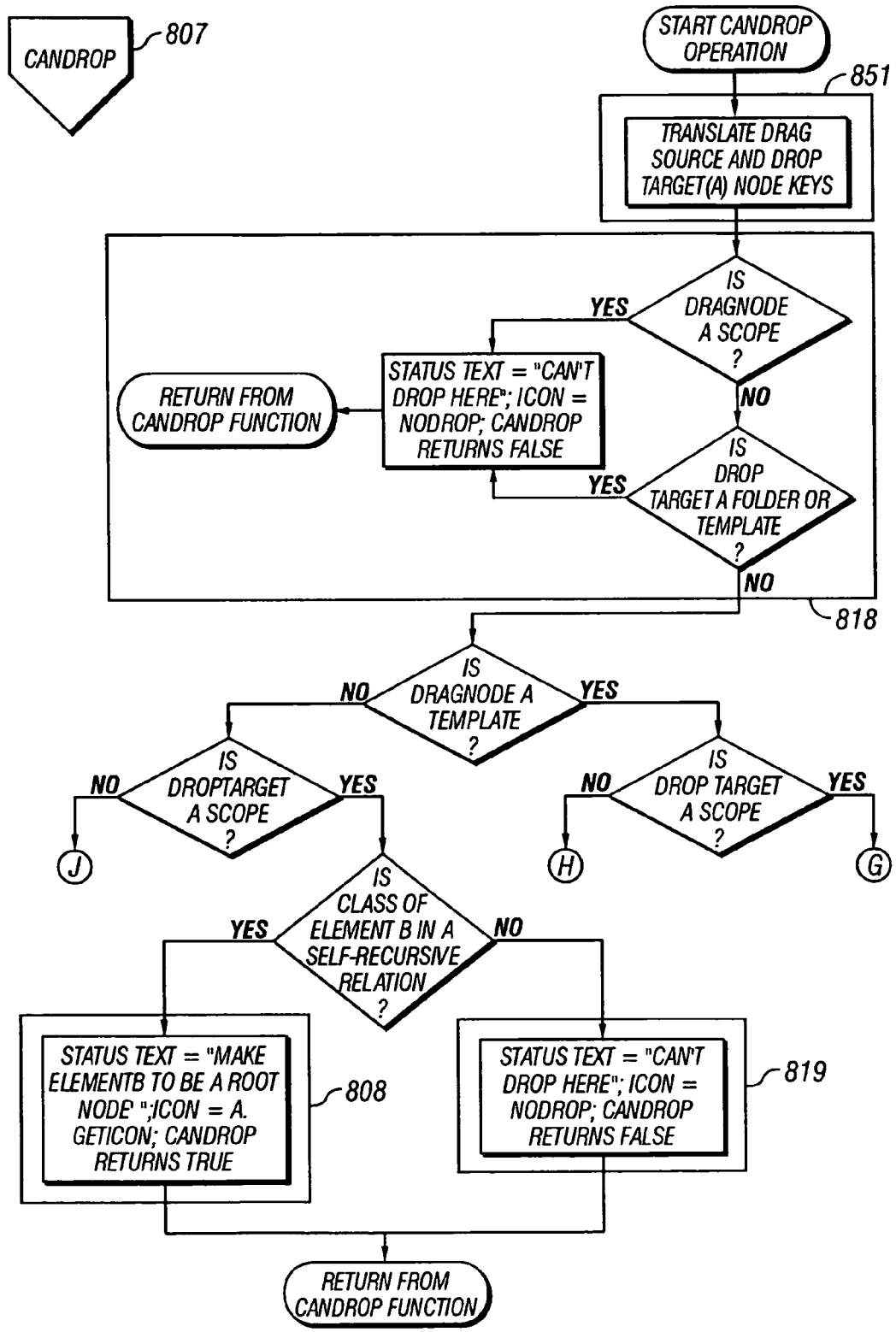
Figure 8F:
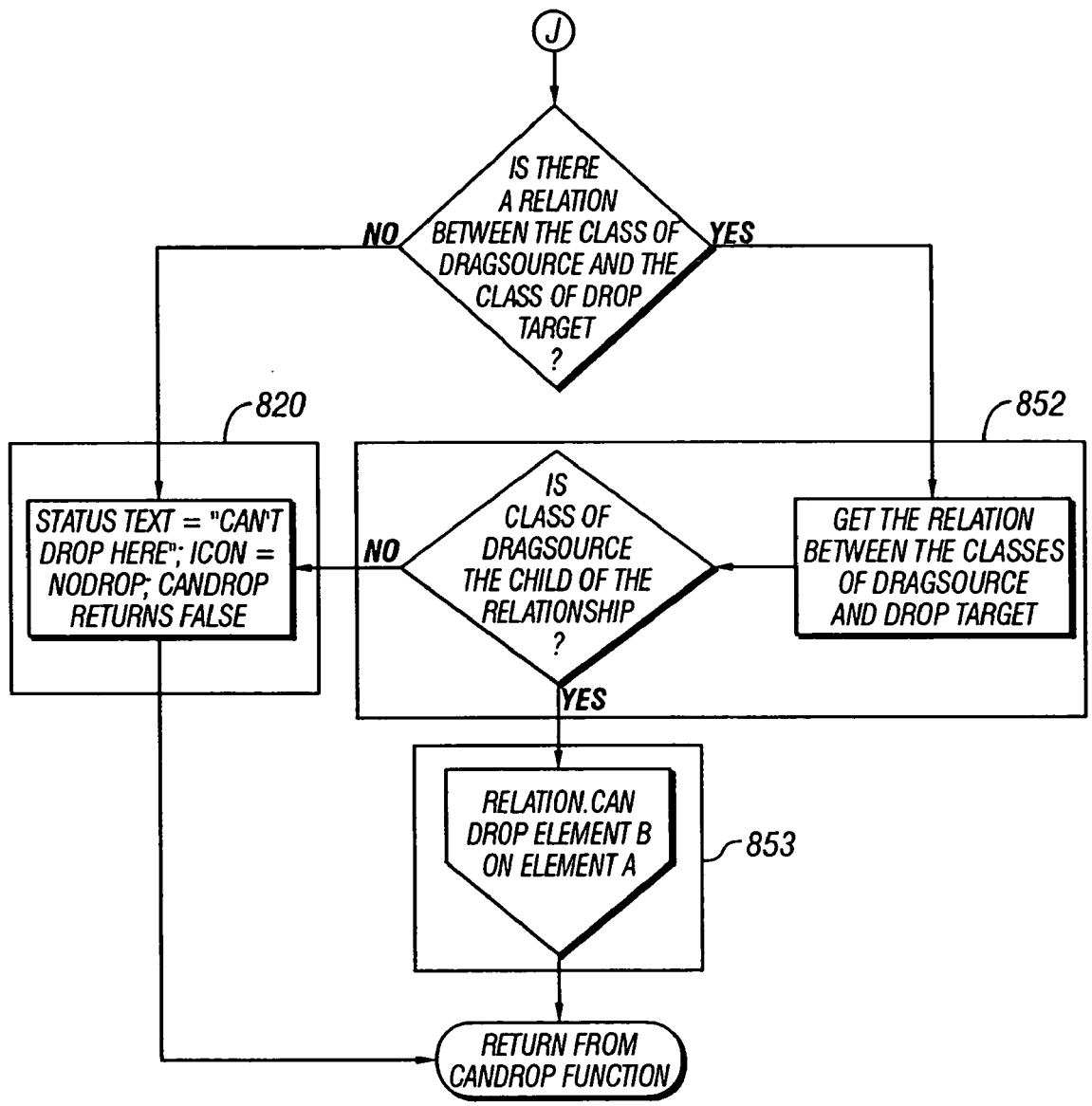
Figure 8G:
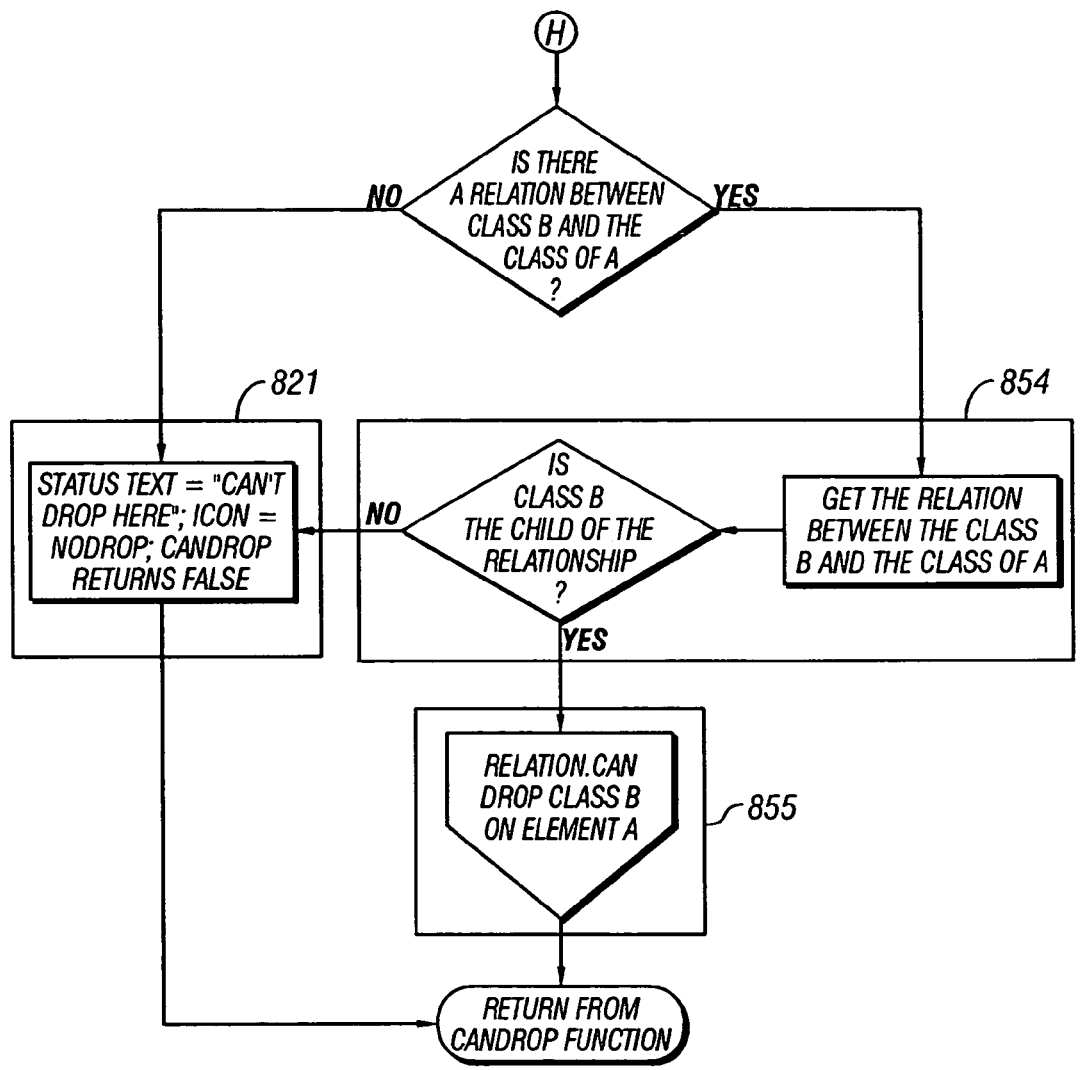
Figure 8H:
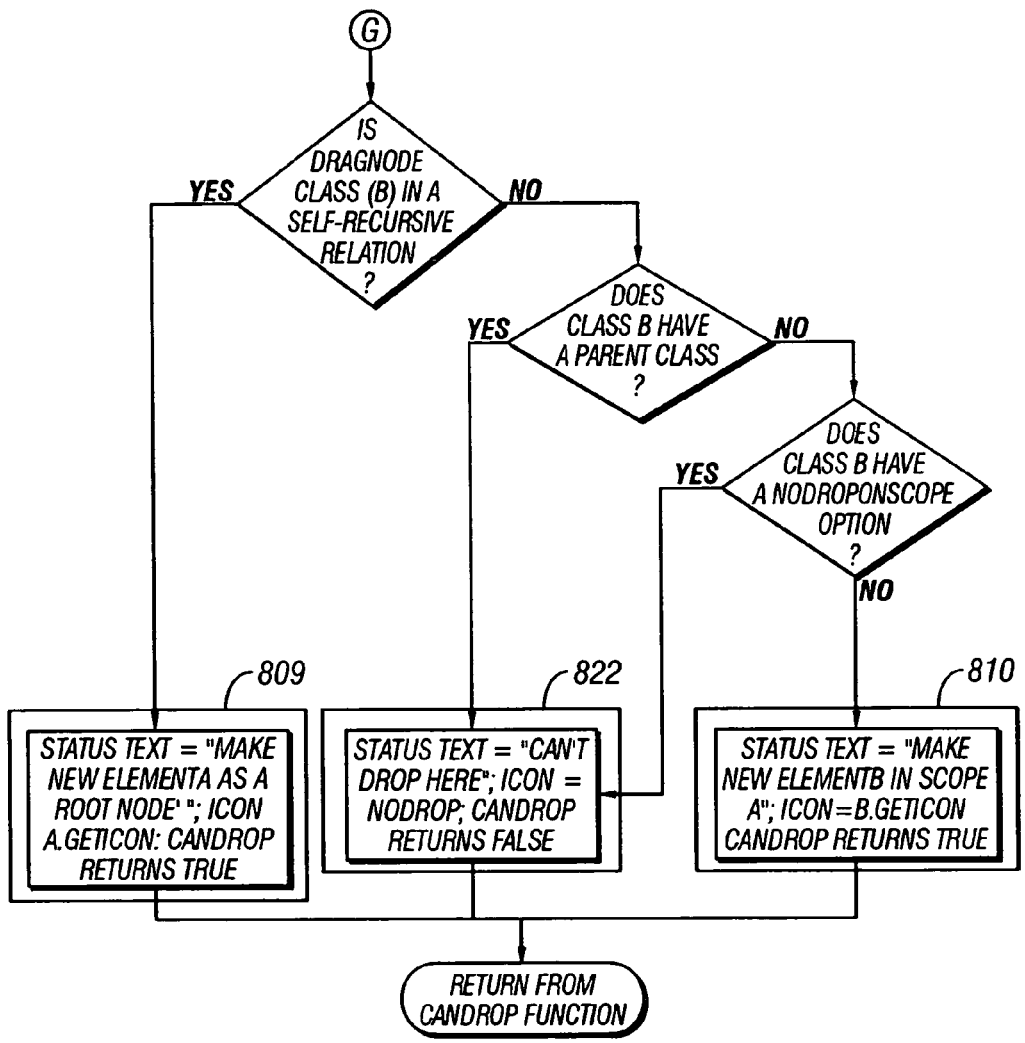
Figure 8I:
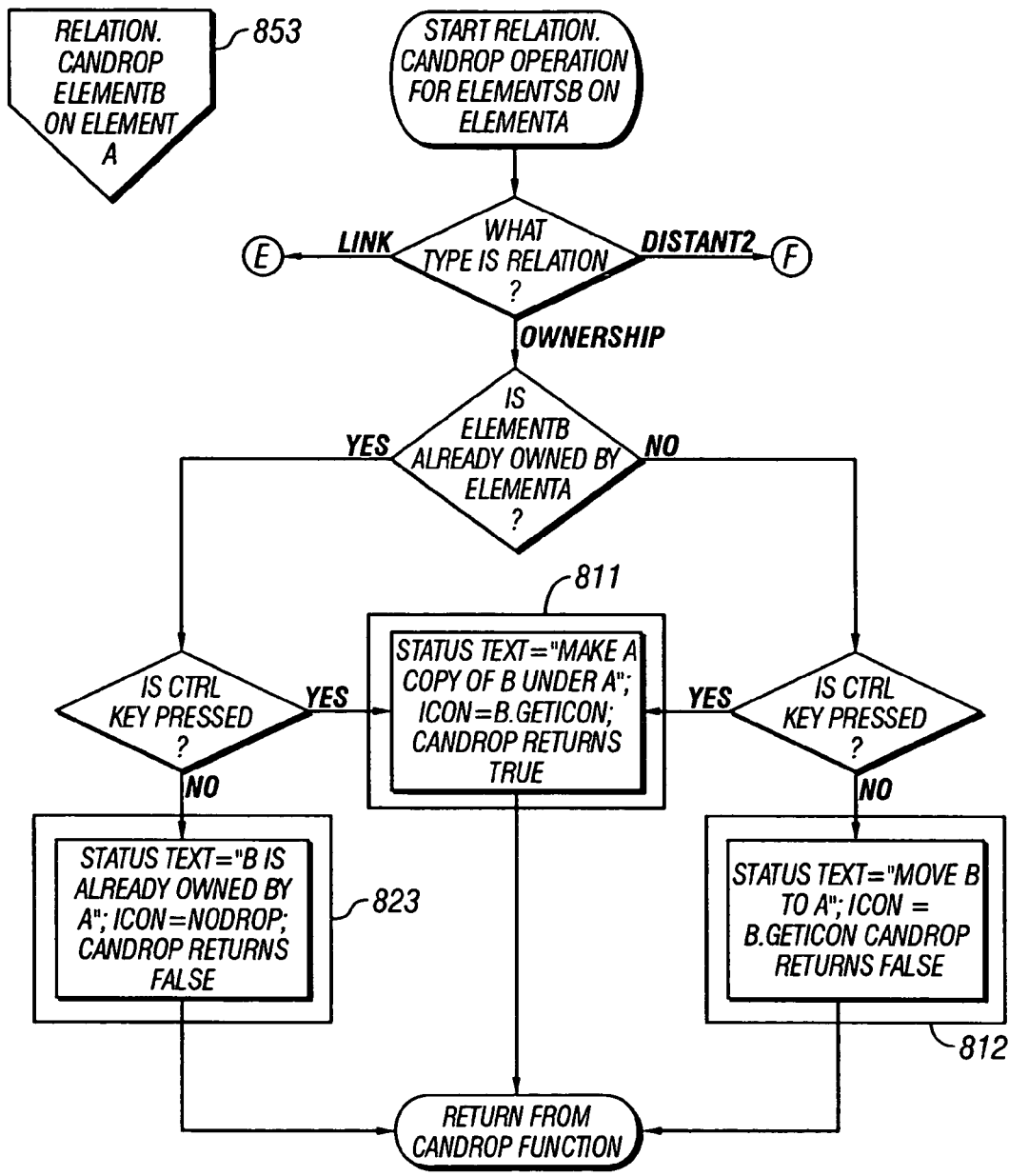
Figure 8K:
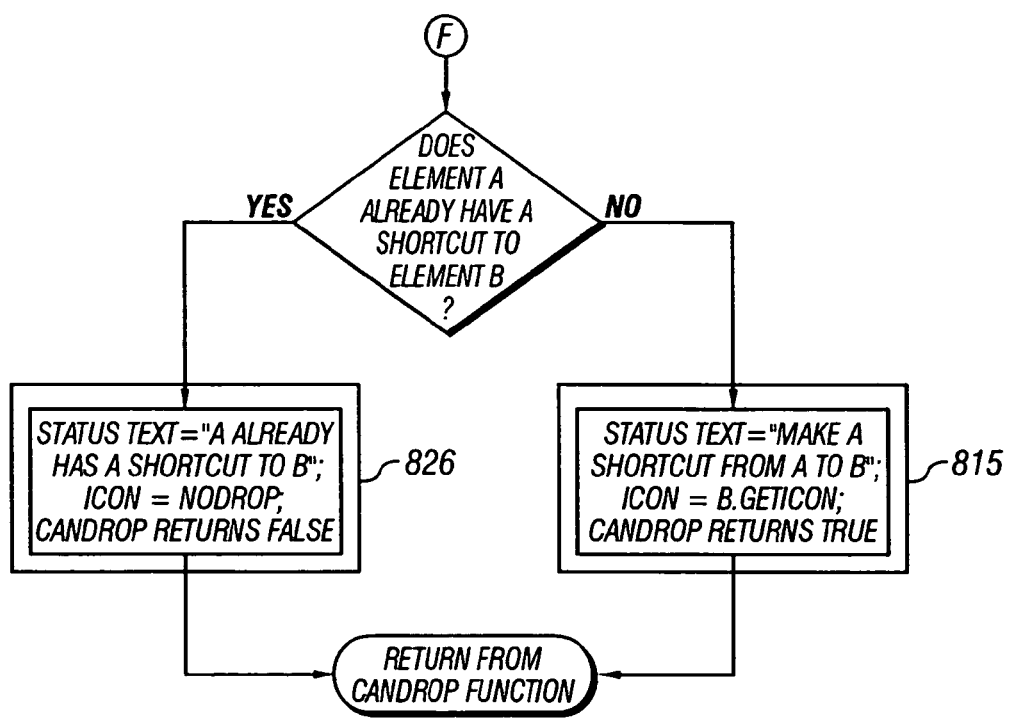
Figure 8L:
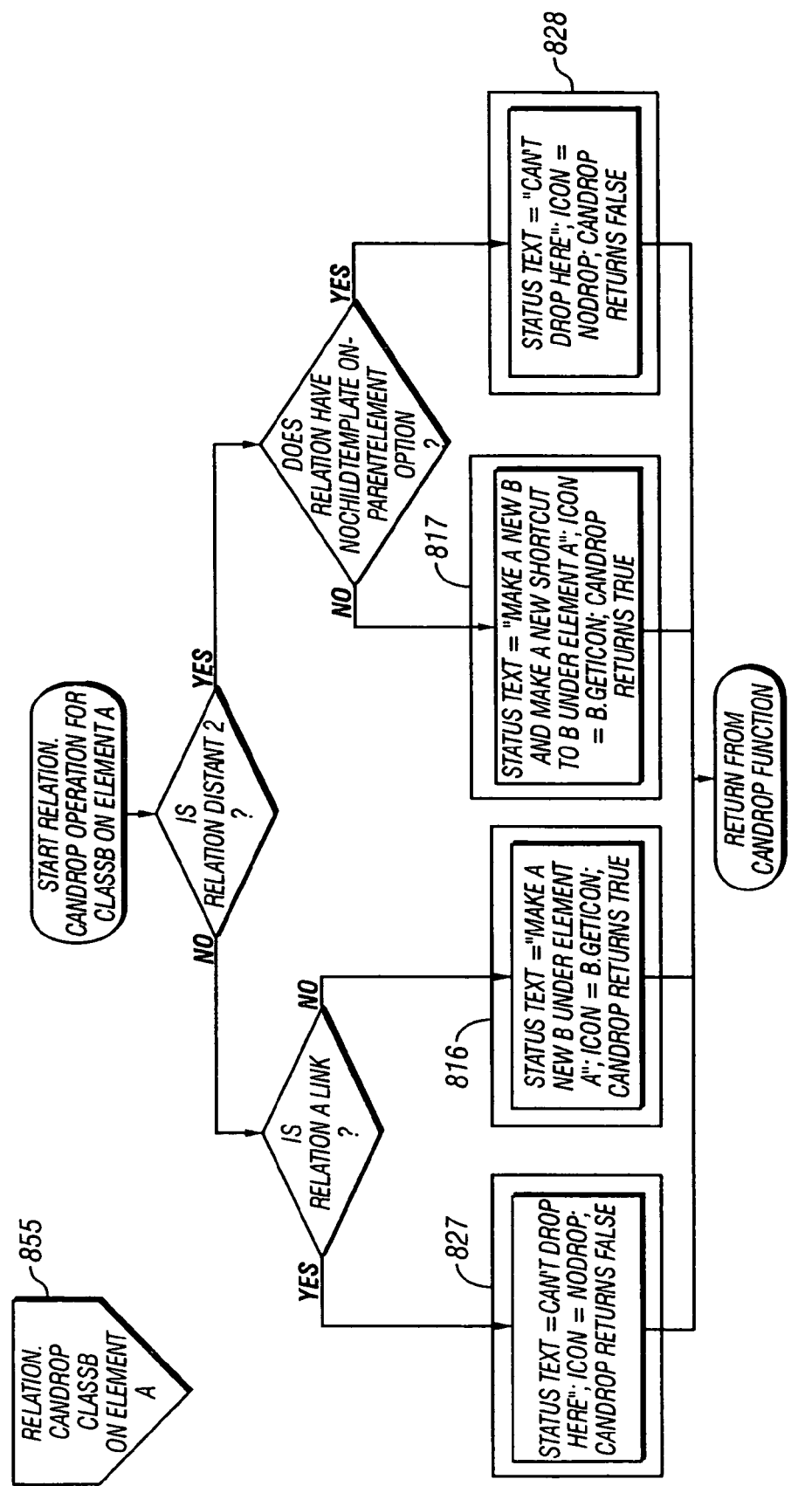
Figure 8M:
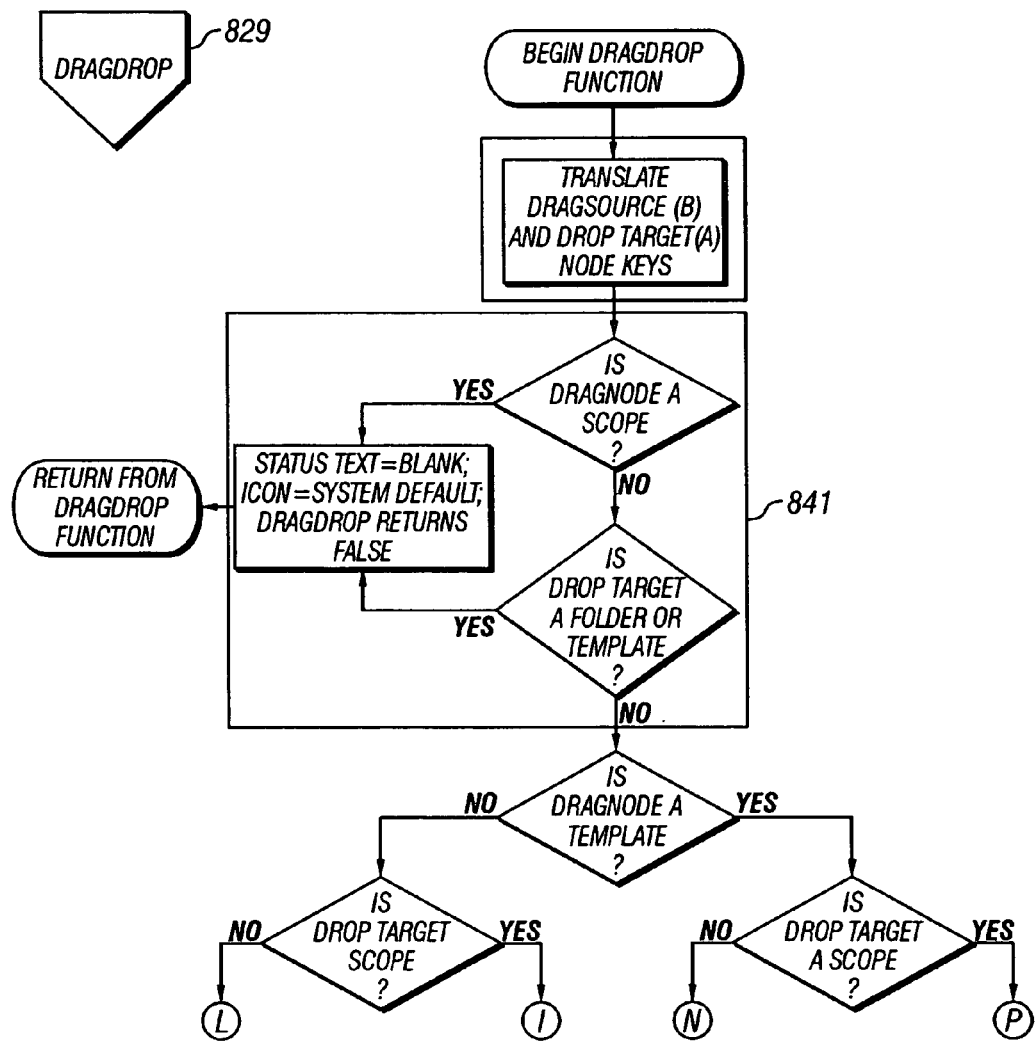
Figure 8N:
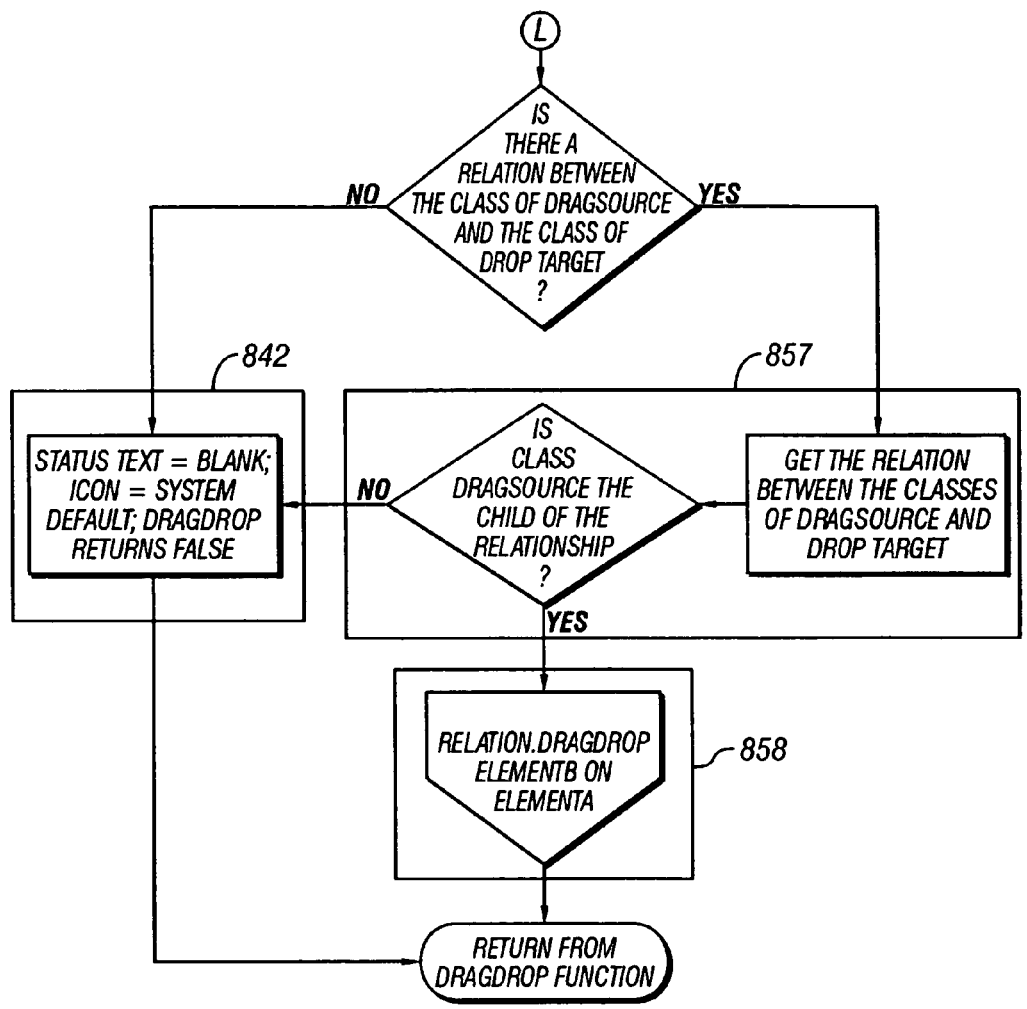
Figure 80:
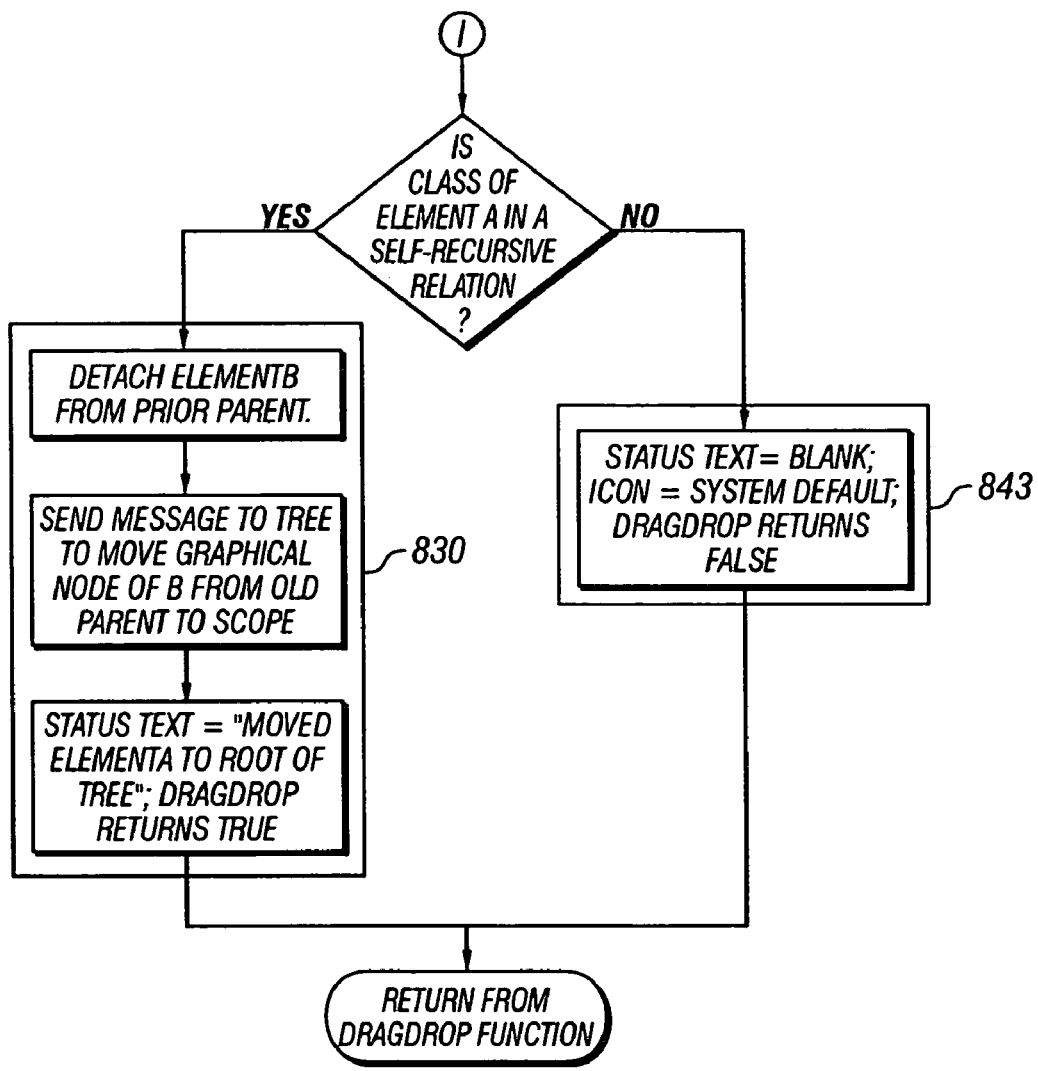
Figure 8P:
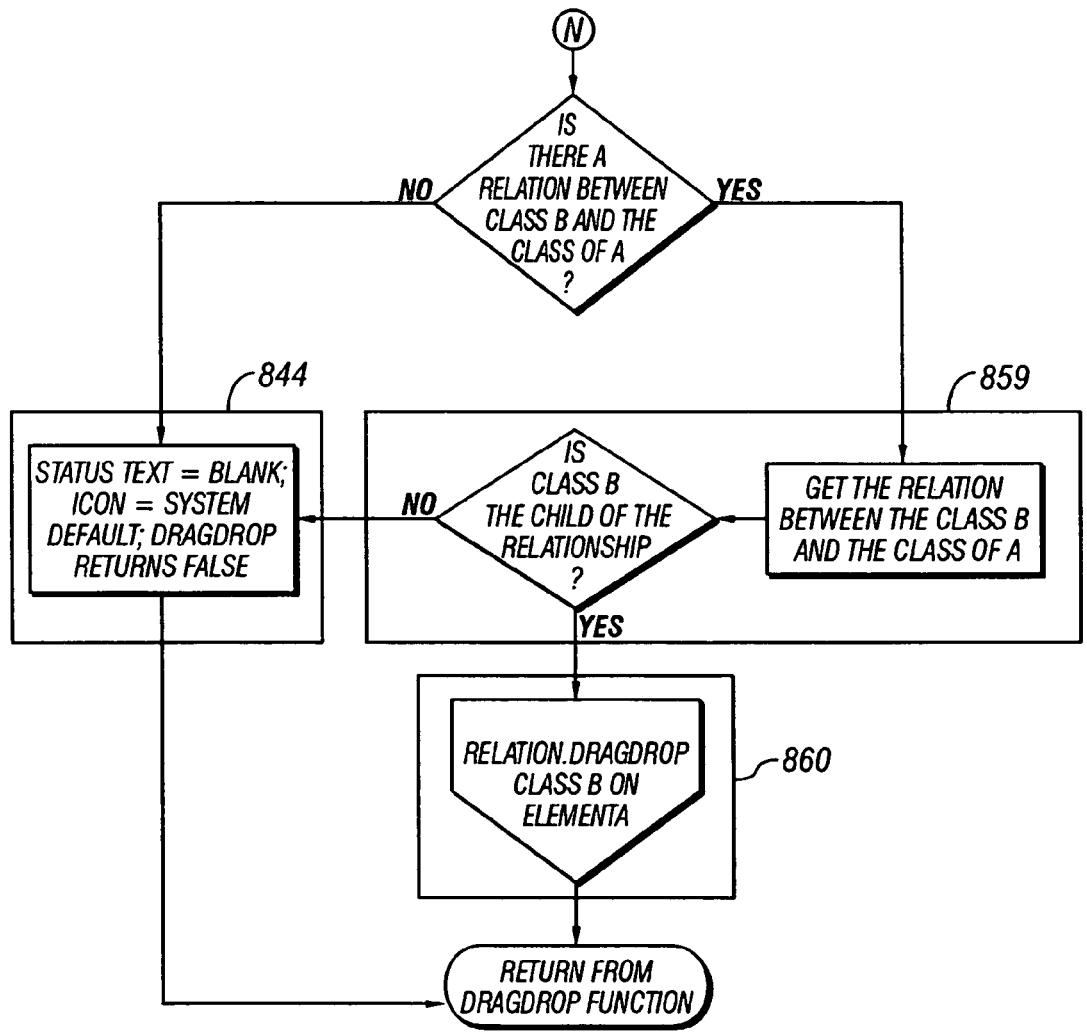
Figure 8Q:
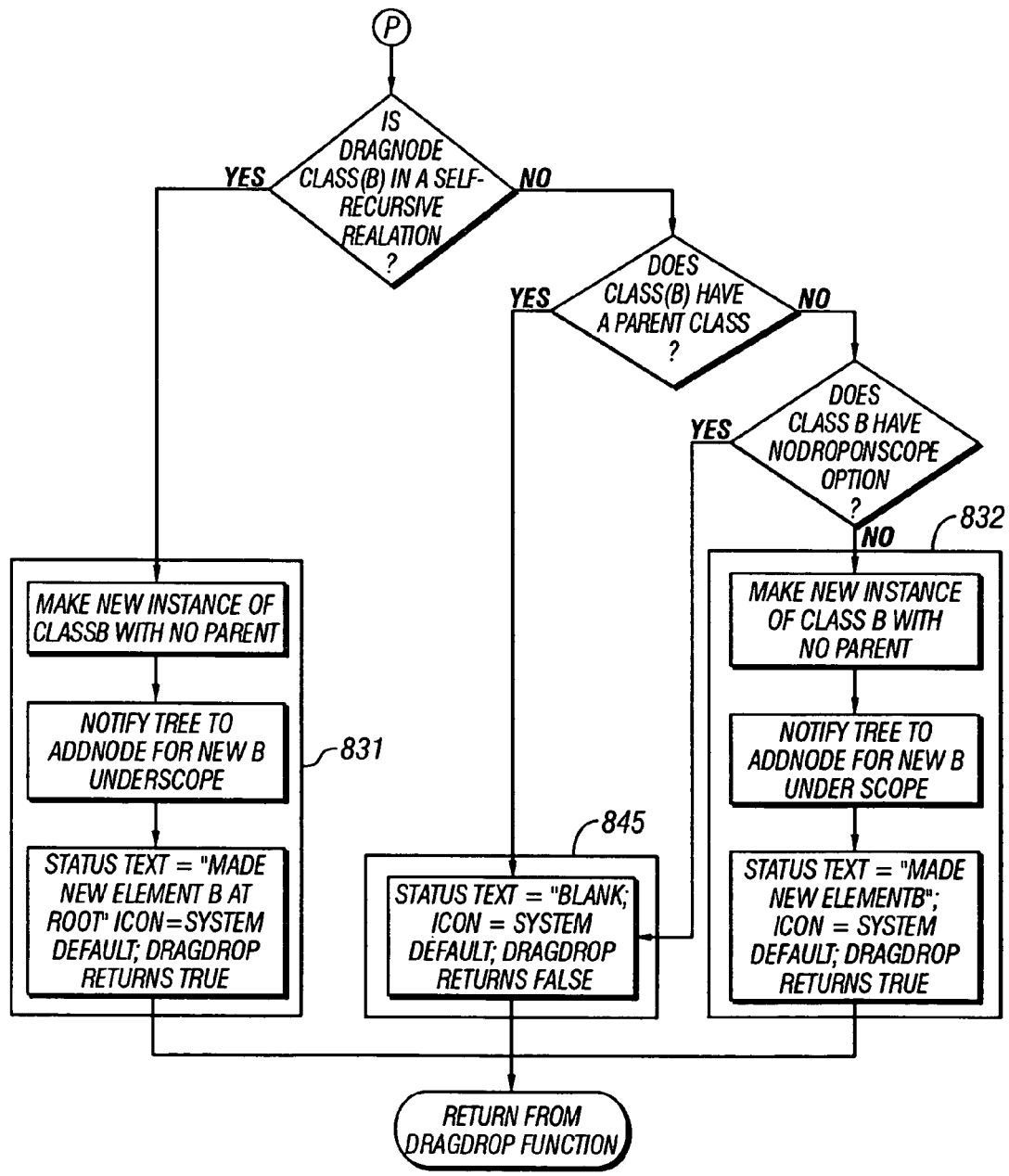
Figure 8R:
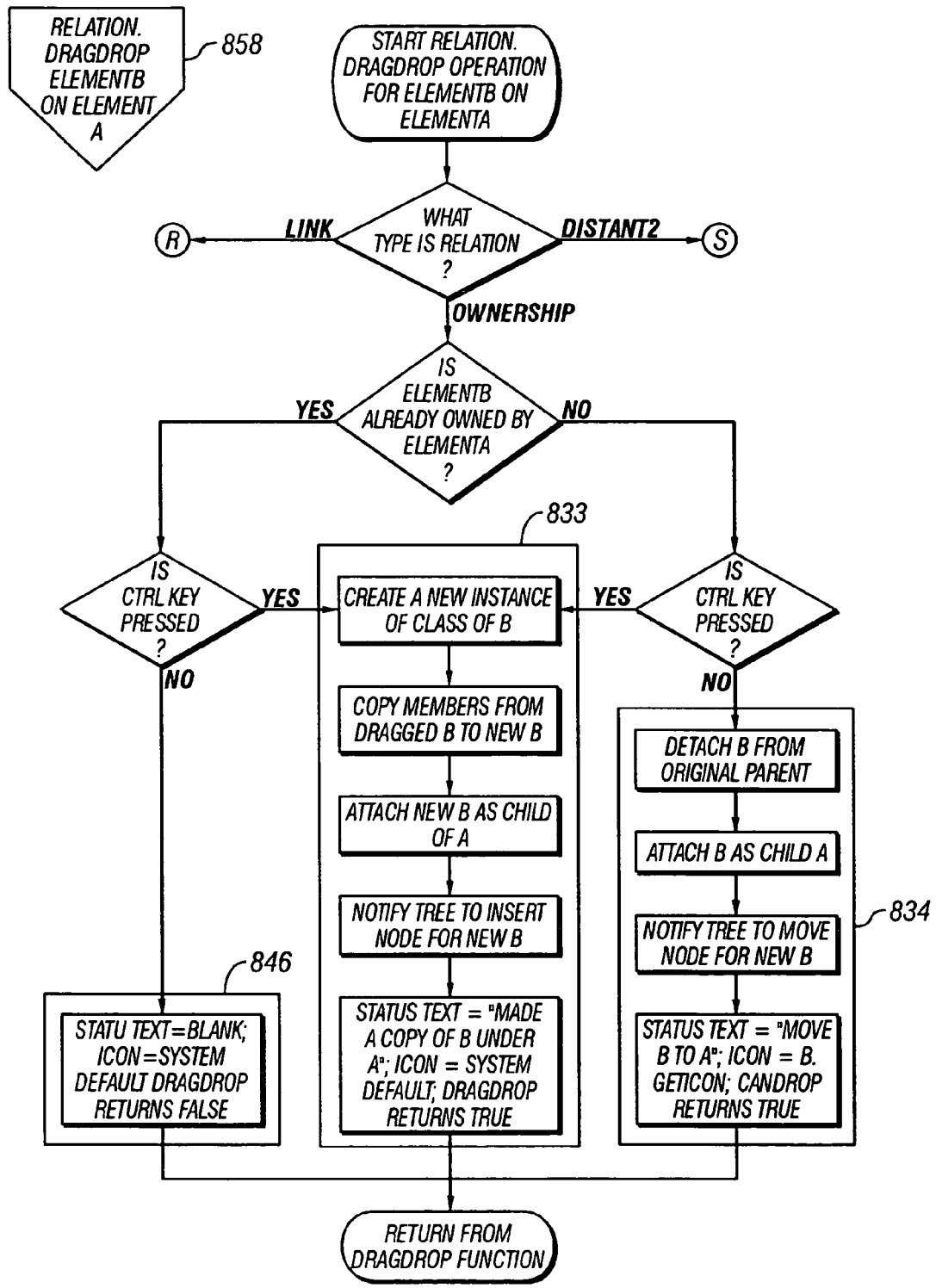
Figure 8S:
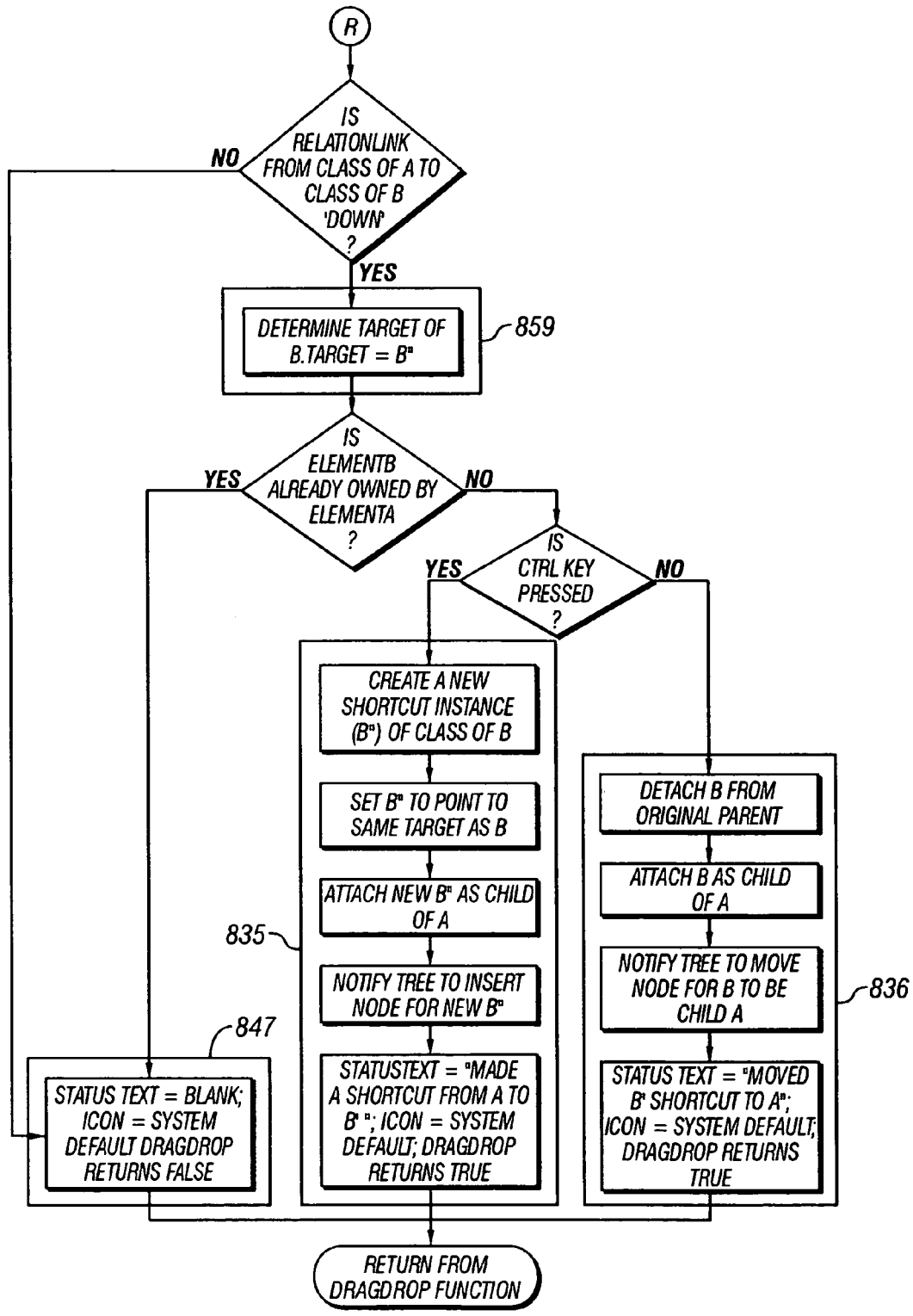
Figure 8T:
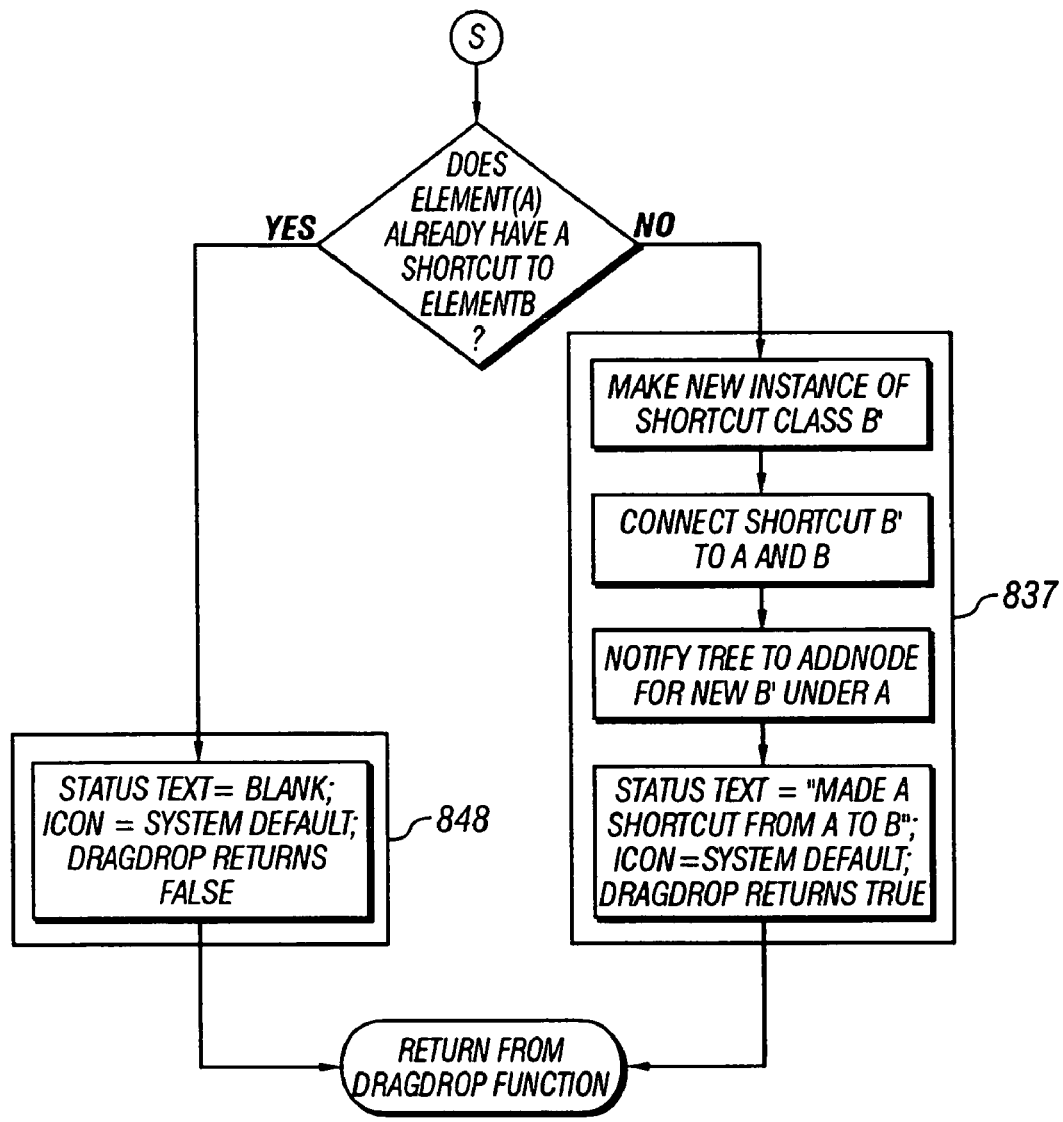
Figure 8U:
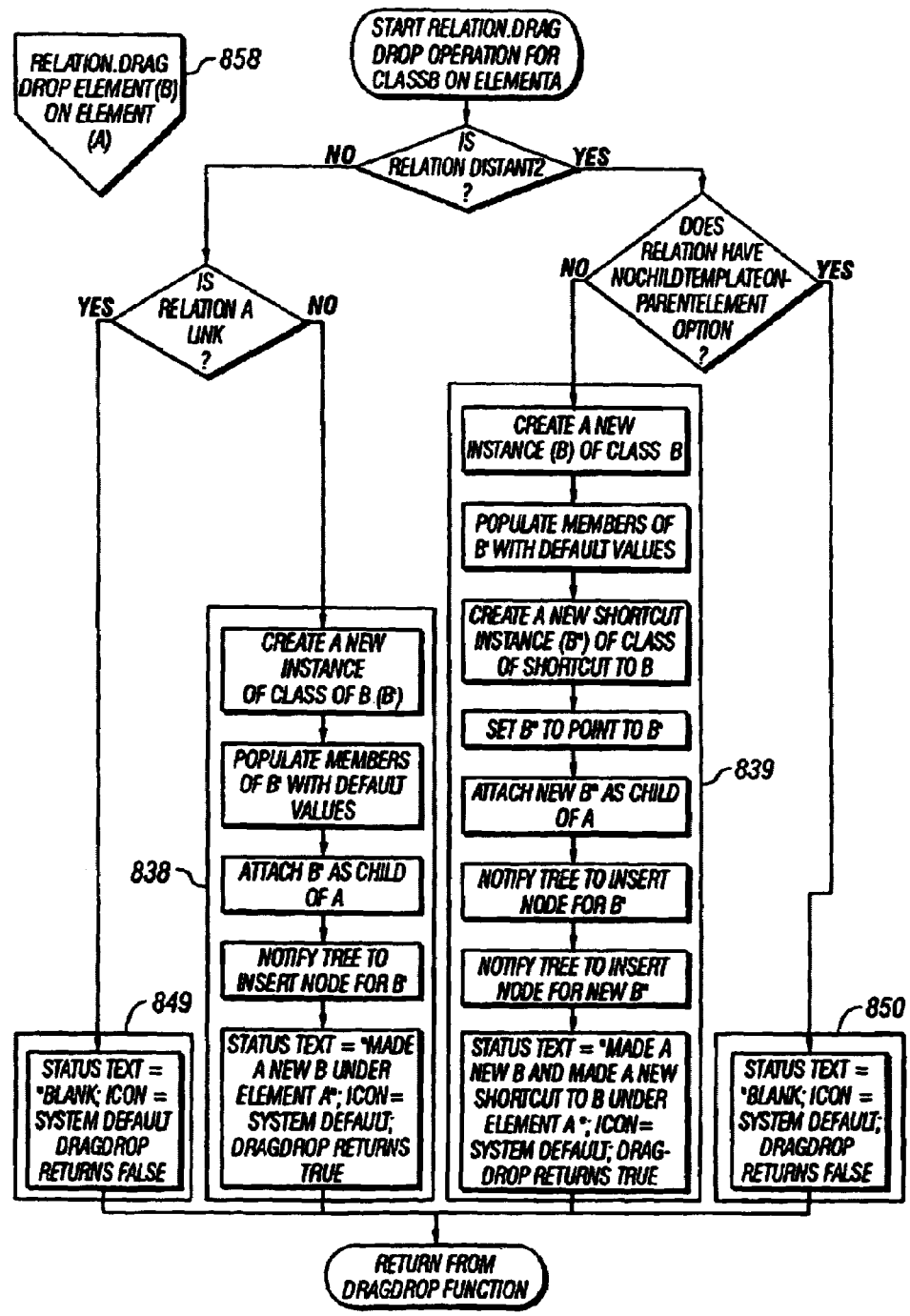

Once a KDContext of edit time data and its corresponding meta model data have been loaded and displayed in the VCUDEC as in FIG. 6, the user can make use of the invention to select individual instances of edit time data and edit said instances. FIG. 7 displays the SelChange (short for Selection Changed) process, by which individual instances are accessed for editing. this operation is executed whenever the user selects a new instance of edit time data. The user selects the desired instance for editing in the VCUDEC by selecting the visual representation of a node, either with a mouse click or keyboard action 71. If the selected node is already selected, or if the node represents a folder or a KDClass, no visual updates to the representation in VCUDEC occur 72. If the new selection does represent an unloaded instance, then any user-edits to the currently loaded instance of time data are committed and stored in the edit time data 73. Identifying information about the newly selected instance is extracted from the edit time data 74. The UDEC further examines the meta data to determine which detail editor form is appropriate. If the appropriate form is not already loaded then it is loaded and populated with data to represent the newly selected edit time instance 75 and the SelChange operation is completed 76.

In addition to being able to edit individual instances of edit time data, the user is also able to change the structure of the edit time data and to create new instances of edit time data by 'dragging' the representative nodes of meta model data and edit time data and 'dropping' them onto instances of edit time data in the VCUDEC interface.

While many applications feature drag-and-drop editing functionality, the features are enabled through program logic that is custom-coded for each type of drag-drop action. This results in significant development effort for non-trivial object models. The present invention provides for drag-drop edit functionality for a multitude of non-trivial object models without custom-coded program logic through the use of the VCUDEC together with the UDEC and the meta model.

In general, the user may drag any node (drag source) that is a visual representation of an element of meta model data or an element of edit time data, and the user may drop the node on a node (drop target) that represents an element of edit time data, provided that the drag-drop edit operation meets constraints specified in the UDEC algorithm and the meta model. A drag-drop edit operation may result in a) no change to the data structure, b) the instantiation and population of one or more new elements of edit time data, or c) in the movement of one or more elements of edit time data to a different location with in the structure. The process by which these constraints are tested and the resulting actions are executed is displayed in detail in FIG. 8 and described in further detail in this section.

The user executes a drag-drop edit operation in a manner similar to drag-drop operations in other applications. The user selects a node in the visual tree representation of the edit time data by clicking on the node with the mouse and holding down the mouse button 801. The user drags the node by moving the mouse with the mouse button held-down. The user can drag the node over other parts of the application, including over other nodes in the visual representation of edit time data. As the user drags the node, visual feedback is exhibited 802, indicating whether a drop at the current location would be a valid edit operation, and what edits would occur as a result of the drop. If the user completes the drag drop edit operation, the visual representation of the edit time data is updated, and a status message is displayed indicating what edits occurred 803.

A drag-drop edit operation is comprised of three phases: CanDrag, CanDrop, and DragDrop. When the user initiates a drag-drop edit operation by selecting a node to drag (the drag source node) 801, the VCUDEC calls the CanDrag method on the UDEC 804, passing information identifying the selected node. The UDEC examines the edit time data and meta model data to determine whether the element of edit time data or meta model data represented by the selected node can participate in a drag-drop edit operation. If it can, CanDrag returns a value indicating such to the VCUDEC. The VCUDEC reacts by entering drag mode and changing the mouse cursor as a visual indicator 805.

As the user drags the node by moving the mouse with the mouse button down, the operation enters the second phase: CanDrop. The user can drag the node over other areas of the application. Drags over these areas are ignored. The user can drag the node over another node (the drop target). Each time the mouse moves, the VCUDEC checks to see if the drag source node is being dragged over a new drop target node or over the same drop target node as in the previous mouse move 806. When the user drags the node over a new drop target node, the VCUDEC calls the CanDrop method 807 on the UDEC, passing information identifying the drag source node and the drop target node. The UDEC examines the edit time data and meta model data to determine whether the element of edit time data or meta model data represented by the drag source node can participate in a drag-drop edit operation with the element of edit time data or meta model data represented by the drop target node. If so, CanDrop returns a value indicating such to the VCUDEC as well as a status string describing the outcome that will result if the edit action is completed by the user 808, 809, 810, 811, 812, 813, 814, 815, 816, 817. The VCUDEC reacts by changing the mouse cursor as a visual indicator and by displaying the status string in the status bar 802. Likewise, if the elements represented by the drag source node and drop target node cannot participate in a drag-drop edit operation, CanDrop returns a value indicating such to the VCUDEC as well as a status string indicating that the a drop is not allowed 818, 819, 820, 821, 822, 823, 824, 825, 826, 827, 828. The VCUDEC reacts by changing the mouse cursor as a visual indicator and by displaying the status string in the status bar 802.

If the user releases the mouse button while dragging the drag source node over a drop target node, the drag-drop edit operation enters the third phase: DragDrop. The VCUDEC calls the DragDrop method 829 on the UDEC, passing information identifying the drag source node and the drop target node. The UDEC examines the edit time data and meta model data using the same CanDrop logic to determine whether the element of edit time data or meta model data represented by the drag source node can participate in a drag-drop edit operation with the element of edit time data or meta model data represented by the drop target node. If so, DragDrop completes the drag-drop edit operation by instantiating zero or more new instances of edit time data elements and/or altering the KDValues of the new and/or existing instances of edit time data elements 830, 831, 832, 833, 834, 835, 836, 837, 838, 839. Before returning, the UDEC causes the VCUDEC to alter the visual representation of the edit time data to represent the new elements of edit time data (if any) 831, 832, 833, 835, 837, 838, 839 and the new or updated KDValues (if any) 830, 831, 832, 833, 834, 835, 836, 837, 838, 839. The UDEC returns a value indicating such to the VCUDEC as well as a status string describing the outcome of the edit action. The VCUDEC reacts by displaying the status string in the status bar, changing the mouse cursor back to the default, and exiting drag mode 840.

If the user releases the mouse button while dragging the drag source node over a drop target where the two represented data elements cannot participate in a drag-drop edit operation, the UDEC returns a value indicating such to the VCUDEC 841, 842, 843, 844, 845, 846, 847, 848, 849, 850. The VCUDEC reacts by changing the mouse cursor back to the default and exiting drag mode 840.

The CanDrag operation 804 determines whether a drag is allowed for the selected node. The CanDrag operation translates the node key to determine whether the node represents an element of edit time data, an element of meta model data, or a folder. If the node represents a folder, then a drag is not allowed, otherwise the drag is allowed for the selected node.

The CanDrop operation 807 determines whether a drag source node can be dropped on a drop target node and gives visual and textual feedback to the user. The operation translates the node keys of the drag source and drop target nodes to determine whether they represent elements of meta model data (templates), edit time data (elements), or folders, respectively 851. If the DragSource represents a Scope or if the DropTarget represents a Folder or a Template (element of meta model data), then a drop is not allowed 818. Otherwise, if the Drop Target Node represents a Scope and the Drag Source node represents an element of edit time data from a KDClass that has a self-recursive instance of KDRelation, the drop is allowed and will result in making the Drag Source node into a root node that has no parent element through its self-recursive KDRelation 808. But if the KDClass of the Drag Source node does not have a self-recursive instance of KDRelation, the drop is not 819. If the Drag Source node represents an element of edit time data or of meta model data (a template) and the Drop Target represents an element of edit time data, the associated KDClass instances can be identified for the Drag Source and Drop Target nodes. If no KDRelation instance relating the two KDClass instances exists, then no drop is allowed and CanDrop will return values indicating such 820, 821.

Otherwise, if both nodes represent elements of edit time data, and there is an instance of KDRelation relating the KDClass instances associated with the nodes 852, then the overloaded KDRelation.CanDrop method 853 is called to determine whether the drop is allowed. The overload of KDRelation.CanDrop that accepts two KDElement instances as input parameters is used.

Otherwise, if the Drag Source node represents and element of meta model data (Template) and the Drop Target node represents an element of edit time data, and there is an instance of KDRelation relating the KDClass instances associated with the nodes 854, then the overloaded KDRelation.CanDrop method 855 is called to determine whether the drop is allowed. The overload of KDRelation.CanDrop that accepts a KDClass instance as the Drag Source input parameter and a KDElement instance as the Drop Target input parameter is used.

Otherwise, if the Drag Source represents an element of meta model data (Template) and the Drop Target represents a KDScope, and the KDClass represented by the Drag Source is in a self-recursive KDRelation, then the drop is allowed 809 and would result in the creation of a new root (parentless) KDElement instance. Similarly, if the KDClass instance represented by the Drag Source is not in a self-recursive KDRelation, but it has no parent KDClass instance, then the Drop is also allowed 810 and would result in the creation of a new root (parentless) KDElement instance, but if the KDClass instance does have a parent class, the drop is not allowed 822.

The overload of KDRelation.CanDrop that accepts two KDElement instances as input parameters 853 is used in some cases as described above to determine whether a node representing a KDElement can be dropped on another node representing a KDElement. If the KDRelation is of type Ownership (the default type) and the Ctrl-key is in a pressed state, then the drop is allowed 811 and would result in the instantiation of a copy of the KDElement represented by the Drag Source node. If the Ctrl-key is not in a pressed state, and the KDElement represented by the Drop Target node is already the parent of the KDElement represented by the Drag Source node, then the drop is not allowed 823. However if the KDElement represented by the Drop Target node is not already the parent, then the drop is allowed and would result in the moving 812 of the KDElement represented by the Drag Source node to the KDElement represented by the Drop Target node as its new parent.

Within the overload of KDRelation.CanDrop that handles a node representing a KDElement instance being dragged over a node representing another KDElement instance, if the KDRelation between the two KDClass instances is a Link (it is owned by a KDRelationLink instance) and the Relation-Direction of the KDRelationLink is not downward from the KDClass of the Drop Target node to the KDClass of the Drag Source node, then the drop is not allowed 825. If it is upward, then it's an indicator that the Drag Source node represents a shortcut to another instance of KDElement. The target object of the shortcut is determined 856 by traversing the associated KDRelationLink. If the Drop Target already owns a shortcut to the target of the Drag Source shortcut, then the drop is not allowed 824. Otherwise, the drop is allowed and would result in a move of the Drag Source to the Drop Target 814 unless the Ctrl-key is in a pressed state, in which case thee drop is allowed and would result in a copy of the Drag Source being created under the Drop Target 813.

Within the overload of KDRelation.CanDrop that handles a node representing a KDElement instance being dragged over a node representing another KDElement instance, if the KDRelation is of type Distant2 and the KDElement represented by the Drop Target node already owns a shortcut to the KDElement represented by the Drag Source node, then the drop is not allowed 826. Otherwise the drop is allowed 815 and would result in the creation of a new shortcut KDElement pointing to the KDElement represented by the Drag Source.node. The new shortcut KDElement would be owned by the KDElement represented by the Drop Target node.

The other overload of KDRelation.CanDrop handles a node representing an element of meta model data (KDClass instance, or template) being dragged over a node representing an instance of edit time data (KDElement instance). If the KDRelation is of type Distant2 and has the bNoChildTemplateOnParentElement option turned on, then the drop is not allowed 828. If the said option is not on for the KDRelation, then the drop is allowed 817 and would result in the creation of a new KDElement based on the KDClass template represented by the Drag Source node, as well as a new shortcut KDElement pointing at it. If the KDRelation is of a Link (it is owned by a KDRelationLink instance), then the drop is not allowed 827. If the KDRelation is of type Ownership (the default type), then the drop is allowed 816 and would result in the creation of a new KDElement based on the KDClass associated with the Drag Source.

The DragDrop operation 829 executes the edit action, updates the edit time data, gives visual and textual feedback to the user in the for of status messages and changes to the visual representation of the edit time data structure in the VCUDEC. The conditional logic features of the DragDrop operation are identical to the conditional logic features of the CanDrop operation. The same conditions that cause the CanDrop operation to represent to the user that the drop is not allowed 818, 819, 820, 821, 822, 823, 824, 825, 826, 827, 828 cause the DragDrop operation to complete without altering the edit time data 841, 842, 843, 844, 845, 846, 847, 848, 849, 850. Similarly, the conditions that that cause the CanDrop operation to represent to the user that the drop is allowed 808, 809, 810, 811, 812, 813, 814, 815, 816, 817 cause the DragDrop operation to complete and alter the edit time data 830, 831, 832, 833, 834, 835, 836, 837, 838, 839. If the DragSource represents a Scope or if the DropTarget represents a Folder or a Template (element of meta model data), then a drop is not allowed 841 and no edit time data changes occur. Otherwise, if the Drop Target Node represents a Scope and the Drag Source node represents an element of edit time data from a KDClass that has a self-recursive instance of KDRelation, the drop results in the moving of the Drag Source node to the root of the self-recursive structure by detaching it from its parent element through the self-recursive KDRelation 830. But if the KDClass of the Drag Source node does not have a self-recursive instance of KDRelation, the drop is not allowed 843. If the Drag Source node represents an element of edit time data or of meta model data (a template) and the Drop Target represents an element of edit time data, the associated KDClass instances can be identified for the Drag Source and Drop Target nodes. If no KDRelation instance relating the two KDClass instances exists, then drop is not allowed and no data change occurs 842, 844.

Otherwise, if both nodes represent elements of edit time data, and there is an instance of KDRelation relating the KDClass instances associated with the nodes 857, then the overloaded KDRelation.DragDrop method 858 is called. The overload of KDRelation.CanDrop that accepts two KDElement instances as input parameters is used.

Otherwise, if the Drag Source node represents and element of meta model data (Template) and the Drop Target node represents an element of edit time data, and there is an instance of KDRelation relating the KDClass instances associated with the nodes 859, then the overloaded KDRelation.DragDrop method 860 is called. The overload of KDRelation.DragDrop that accepts a KDClass instance as the Drag Source input parameter and a KDElement instance as the Drop Target input parameter is used.

Otherwise, if the Drag Source represents an element of meta model data (Template) and the Drop Target represents a KDScope, and the KDClass represented by the Drag Source is in a self-recursive KDRelation, then the drop is allowed 831 and results in the creation of a new root (parentless) KDElement instance and its insertion into the visual representation. Similarly, if the KDClass instance represented by the Drag Source is not in a self-recursive KDRelation, but it has no parent KDClass instance, then the Drop is also allowed 832 and results in the creation of a new root (parentless) KDElement instance and its insertion into the visual representation, but if the KDClass instance does have a parent class, the drop is not allowed 845 and no data change occurs.

The overload of KDRelation.DragDrop that accepts two KDElement instances as input parameters 858 is used in some cases as described above. If the KDRelation is of type Ownership (the default type) and the Ctrl-key is in a pressed state, then the drop is allowed 833 and results in the instantiation of a copy of the KDElement represented by the Drag Source node, where said copy is owned by the KDElement represented by the Drop Target node. If the Ctrl-key is not in a pressed state, and the KDElement represented by the Drop Target node is already the parent of the KDElement represented by the Drag Source node, then the drop is not allowed 846 and no data change occurs. However if the KDElement represented by the Drop Target node is not already the parent, then the drop is allowed and results in the moving 834 of the KDElement represented by the Drag Source node from its prior parent to the KDElement represented by the Drop Target node as its new parent.

Within the overload of KDRelation.DragDrop that handles a node representing a KDElement instance being dropped on a node representing another KDElement instance, if the KDRelation between the two KDClass instances is a Link (it is owned by a KDRelationLink instance) and the RelationDirection of the KDRelationLink is not downward from the KDClass of the Drop Target node to the KDClass of the Drag Source node, then the drop is not allowed 825 and no data change occurs. If it is upward, then it's an indicator that the Drag Source node represents a shortcut to another instance of KDElement. The target KDElement of the shortcut is determined 859 by traversing the associated KDRelationLink. If the Drop Target already owns a shortcut to the target of the Drag Source shortcut, then the drop is not allowed 847 and no data change occurs. Otherwise, the drop is allowed and results in a move of the Drag Source to the Drop Target 836 unless the Ctrl-key is in a pressed state, in which case thee drop results in a copy of the Drag Source being created under the Drop Target 835.

Within the overload of KDRelation.DragDrop that handles a node representing a KDElement instance being dropped on a node representing another KDElement instance, if the KDRelation is of type Distant2 and the KDElement represented by the Drop Target node already owns a shortcut to the KDElement represented by the Drag Source node, then the drop is not allowed 848 and no data change occurs. Otherwise the drop is allowed 837 and results in the creation of a new shortcut KDElement pointing to the KDElement represented by the Drag Source node. The new shortcut KDElement is owned by the KDElement represented by the Drop Target node and the visual representation in the VCUDEC is updated to include the new shortcut.

The other overload of KDRelation.DragDrop handles a node representing an element of meta model data (KDClass instance, or template) being dropped on a node representing an instance of edit time data (KDElement instance). If the KDRelation is of type Distant2 and has the bNoChildTemplateOnParentElement option turned on, then the drop is not allowed 850 and no data change occurs. If the said option is not on for the KDRelation, then the drop is allowed 839 and results in the creation of a new KDElement based on the KDClass template represented by the Drag Source node, as well as a new shortcut KDElement pointing at it. The visual representation in the VCUDEC is updated to display both. If the KDRelation is a Link (it is owned by a KDRelationLink instance), then the drop is not allowed 849 and no data change occurs. If the KDRelation is of type Ownership (the default type), then the drop is allowed 838 and results in the creation of a new KDElement based on the KDClass associated with the Drag Source.

Figure 9:
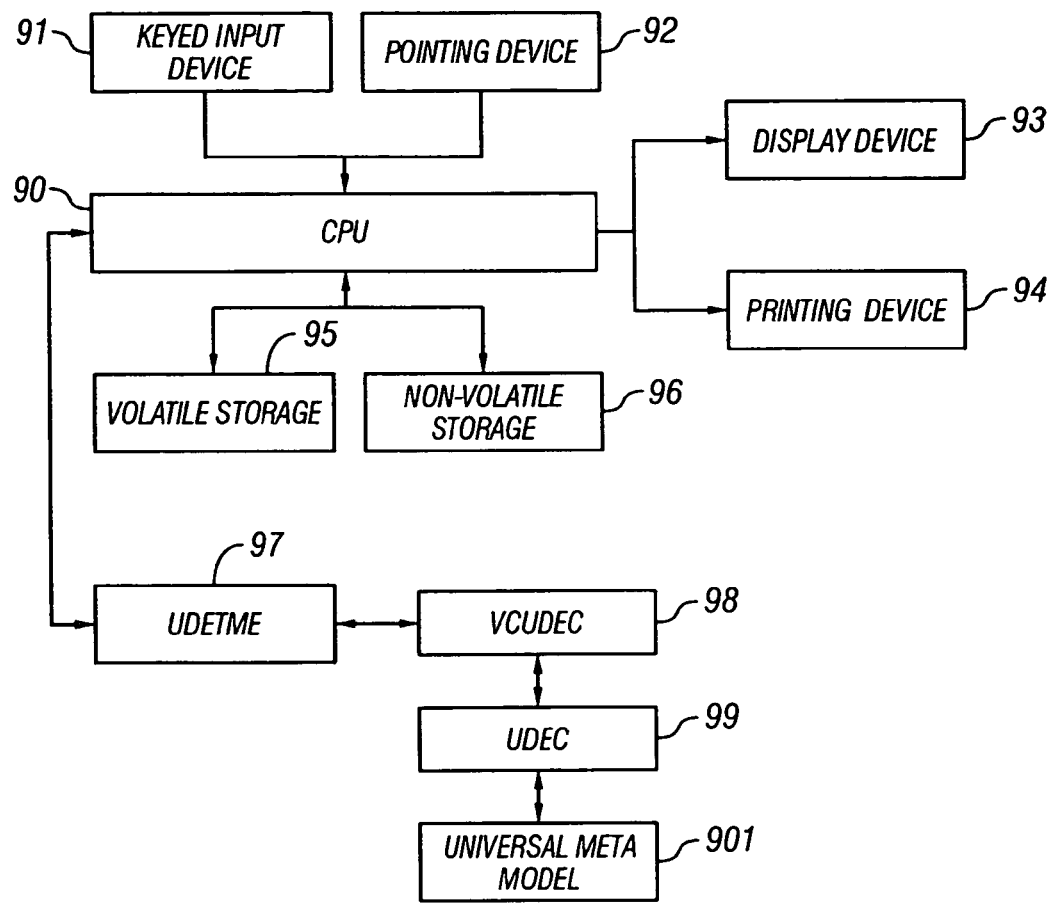
FIG. 9 is a block diagram of the computer system of the present invention.

In operation, the invention is especially, but not exclusively, designed for use with a CPU 90, as illustrated in FIG. 9, which is controlled from a keyboard 91, and or a cartesian pointing device 92 such as a mouse, trackball or touch pad. These devices are adapted to introduce user-generated data. The CPU 90 controls all data which uses the invention and produces output at a display device 93 and or a printing device 94.

At runtime the user generated data is held in system memory volatile storage 95, and can be stored persistently on non-volatile storage 96 such as magnetic tape, magnetic disk, or optical disk. The CPU 90 mediates user-generated system command messages from the input devices to interface with UDETME 97. UDETME 97 delegates system command messages to an extension object, such as VCUDEC 98. VCUDEC 98 adapts system command messages to methods of UDEC 99. UDEC 99 responds to user commands by analyzing user-generated data and meta model data in universal meta model 901. UDEC 99 returns results and directives to VCUDEC 98, which resolves and causes CPU 90 to display visual representation on display device 93 or printing device 94.

For example, perhaps a body of meta model data is directed at defining valid formations and validation constraints for a configurable processor that diagnoses medical symptoms. The user would interact with one or more input devices 91, 92 and one or more output device 93, 94 to add, modify, and delete user-generated data. The system components 97, 98, 99, 901 analyze the user edit actions to verify that the resultant user-defined data conforms with the formation constraints set forth in the meta model data. In the example, the user-generated data might consist of diagnosis rules for accepting or rejecting diagnosis hypotheses. The system would enforce that the user enters only valid data defining the diagnosis rules that conform to good medical practice.

Those skilled in the art will appreciate that this is exemplary and many other variations on the invention will still infringe.

What is claimed:

1. A universal meta model for creating tools for other meta models, the universal meta model implemented on a computer readable medium or in computer memory and comprising:
   a. means for representing a plurality of classes of objects;
   b. means for representing a plurality of default class behavior categories;
   c. means for representing a plurality of data members of classes of objects;
   d. means for representing a plurality of default member behavior categories;
   e. means for representing a plurality of varied and unanticipated composite relationships between classes of objects;
   f. means for representing a plurality of relationships between objects;
   g. means responsive to at least one of a–f for representing edit-time data formations and validation constraints thereon;
   h. means for receiving a plurality of edit commands; and
   i. means for interpreting said edit commands, identifying valid edit commands, and executing said valid edit commands to alter said data formations in conformance with the validation constraints of said universal meta model.

2. A universal meta model as in claim 1 comprising means for representing a plurality of optional additional class behaviors for a plurality of class behavior categories.

3. A universal meta model as in claim 1 comprising means for representing a plurality of optional additional member behaviors for a plurality of member behavior categories.

4. A universal meta model as in claim 1 comprising means for representing a plurality of links between relationships between classes of objects.

5. A universal meta model as in claim 4 comprising means for representing a plurality of composite relationships composed of a plurality of links between a plurality of relationships between classes of objects.

6. A universal meta model as in claim 4 comprising means for representing direction of relation links.

7. A universal meta model as in claim 1 comprising means for representing a plurality of default relationship behavior categories.

8. A universal data editor component comprising
   a. a universal meta model as in claim 1;
   b. means for storing data instantiations of said universal meta model classes;
   c. means for storing data instantiations of said universal meta model members;
   d. means for storing data instantiations of said universal meta model relations; and
   e. means for storing data instantiations of said universal meta model relation links.

9. A universal data editor component as in claim 8 comprising
   a. means for storing data instantiations of said universal meta model tree views; and
   b. means for storing data instantiations of said universal meta model tree levels.

10. A universal data editor component as in claim 8 comprising
    a. means for storing data instantiations of said universal meta model elements representing instantiations of classes represented by said universal meta model classes; and
    b. means for storing data instantiations of said universal meta model values representing instantiations of said universal meta model members.

11. A viewer and controller for universal data editor component comprising
    a. a universal data editor component as in claim 8;
    b. means for displaying a graphical representation of data;
    c. means for displaying textual representation of data; and
    d. means for displaying tabular representation of data.

12. A viewer and controller for universal data editor component as in claim 11 comprising
    a means for displaying a graphical representation of data formations;

b. means for displaying textual representation of data formations; and
c. means for displaying tabular representation of data formation.

13. A universal meta model for creating tools for other meta models, the universal meta model implemented on a computer readable medium or in computer memory, and comprising:
   a means for representing a plurality of classes of objects;
   b. means for representing a plurality of default class behavior categories;
   c. means for representing a plurality of data members of classes of objects;
   d. means for representing a plurality of default member behavior categories;
   e. means for representing a plurality of virtual recursive relationships between classes of objects;
   f. means for representing virtual recursive relationships between objects;
   g. means responsive to at least one of a–f for representing edit-time data formations and virtual recursive validation constraints thereon;
   h. means for receiving a plurality of edit commands; and
   i. means for interpreting said edit commands, identifying valid edit commands, and executing said valid edit commands to alter said data formations in conformance with said virtual recursive constraints of said universal meta model.

14. Previously presented) A universal meta model for creating tools for other meta models, the universal meta model implemented on a computer readable medium or in computer memory, and comprising:
   a. means for representing a plurality of classes of objects;
   b. means for representing a plurality of default class behavior categories;
   c. means for representing a plurality of data members of classes of objects;
   d. means for representing a plurality of default member behavior categories;
   e. means for representing a plurality of varied and unanticipated distant virtual recursive relationships between classes of objects;
   f. means for representing distant virtual recursive relationships between objects;
   g. means responsive to at least one of a–f for representing edit-time data formations and distant virtual recursive validation constraints thereon;
   h. means for receiving a plurality of edit commands; and
   i. means for interpreting said edit commands, identifying valid edit commands, and executing said valid edit commands to alter said data formations in conformance with said distant virtual recursive constraints of said universal meta model.

15. The universal meta model as recited in claim 14, further comprising
   a. means for receiving a representation of a CanDrop edit request comprising a drag source representative of a first object and a drop target representative of a second object
   b. means for determining validity of said CanDrop edit request by interpreting i) a meta model; ii) a plurality of instantiations of meta model data including composite relationships; and iii) a plurality of instantiated edit time data;
   c. means for executing valid edit commands to alter said data formations in conformance with constraints of said meta model; and
   d. means for returning a signal in response to invalid edit commands indicative of basis for such invalidity such that editing, testing, and execution environments can be created for independently-conceived meta models.

* * * * *